United States Patent
Stenneth et al.

(10) Patent No.: US 10,762,364 B2
(45) Date of Patent: Sep. 1, 2020

(54) METHOD, APPARATUS, AND SYSTEM FOR TRAFFIC SIGN LEARNING

(71) Applicant: HERE GLOBAL B.V., Eindhoven (NL)

(72) Inventors: Leon Stenneth, Chicago, IL (US); Sebastian Zaba, Frankfort, IL (US); Zhenhua Zhang, Chicago, IL (US); Lakshmi Nookala, Arlington Heights, IL (US); Prashant Chauhan, Mount Prospect, IL (US); Pradeepa Kavindapadi Nagarajan, Chicago, IL (US); Yu Yang Bai, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 75 days.

(21) Appl. No.: 15/957,518

(22) Filed: Apr. 19, 2018

(65) Prior Publication Data

US 2019/0325235 A1  Oct. 24, 2019

(51) Int. Cl.
*G06K 9/00* (2006.01)
*G06K 9/62* (2006.01)
(Continued)

(52) U.S. Cl.
CPC ......... *G06K 9/00818* (2013.01); *G06F 16/29* (2019.01); *G06F 16/35* (2019.01);
(Continued)

(58) Field of Classification Search
None
See application file for complete search history.

(56) References Cited

U.S. PATENT DOCUMENTS 9,177,212 B2   11/2015  Meis et al.
9,626,865 B2    4/2017  Yokochi et al.
(Continued)

FOREIGN PATENT DOCUMENTS

DE   102015205869 A1   10/2016
DE   102016208621 A1   11/2017
JP     2012185076 A     9/2012

OTHER PUBLICATIONS

Puthong et al., "A Complete System to Determine the Speed Limit by Fusing a GIS and a Camera", submitted on Nov. 30, 2011, 2011 14 International IEEE Conference on Intelligent Transportation Systems, Oct. 5-7, 2011, pp. 1686-1691.
(Continued)

*Primary Examiner* — Idowu O Osifade
(74) *Attorney, Agent, or Firm* — Ditthavong & Steiner, P.C.

(57) ABSTRACT

An approach is provided for traffic sign learning. The approach involves, for example, receiving a plurality of traffic sign observations generated using sensor data collected from a plurality of vehicles. Each of the plurality of traffic sign observations includes location data and sign property data for an observed traffic sign corresponding to said each of the plurality of traffic sign observations. The approach also involves clustering the plurality of traffic speed sign observations into at least one cluster based on the location data and the sign property data. The approach further involves determining a learned sign for the at least one cluster, and determining a learned sign value indicated by the learned sign based on the location data, the sign property data, or a combination of the plurality of traffic sign observations aggregated in the at least one cluster.

20 Claims, 15 Drawing Sheets

(51) Int. Cl.
*G06F 16/29* (2019.01)
*G06F 16/35* (2019.01)

(52) U.S. Cl.
CPC ....... *G06K 9/00476* (2013.01); *G06K 9/6262* (2013.01); *B60R 2300/302* (2013.01)

(56) References Cited

U.S. PATENT DOCUMENTS

| | | |
|---|---|---|
| 9,830,510 B2 | 11/2017 | Anastassov et al. |
| 2009/0041304 A1 | 2/2009 | Bradai et al. |
| 2015/0285639 A1 | 10/2015 | Basalamah et al. |
| 2016/0042239 A1 | 2/2016 | Fowe et al. |
| 2016/0170414 A1 | 6/2016 | Chen et al. |
| 2018/0227853 A1* | 8/2018 | Kench ............... H04W 52/0258 |

OTHER PUBLICATIONS

Office Action for corresponding European Patent Application No. 19175426.6-1203, dated Feb. 14, 2020, 10 pages.

* cited by examiner

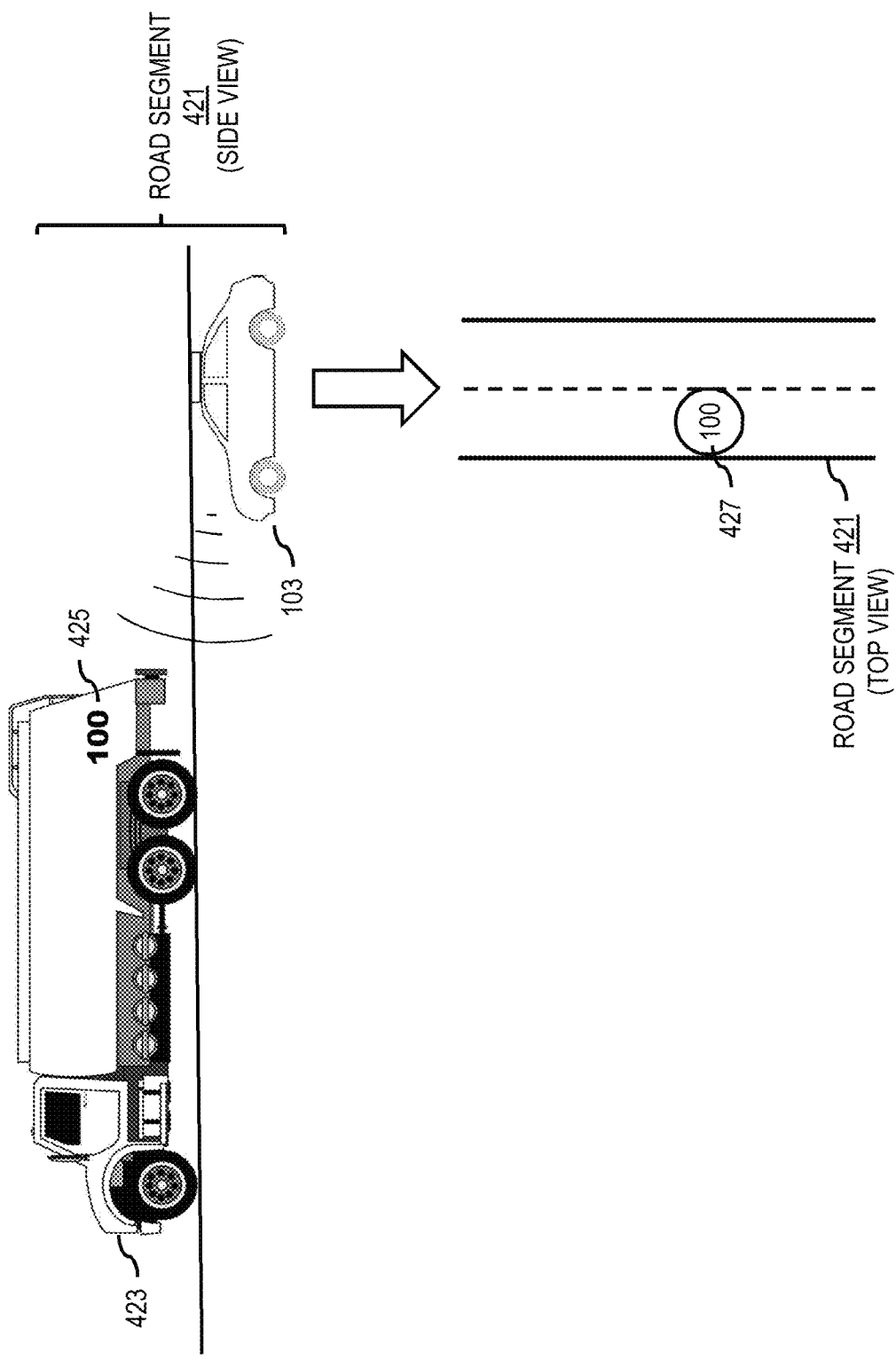

METHOD, APPARATUS, AND SYSTEM FOR TRAFFIC SIGN LEARNING

BACKGROUND

Advances in computer vision systems and feature detectors (e.g., machine learning based feature detectors such as neural networks) are leading to accelerated development of autonomous driving and related mapping/navigation services. For example, such computer vision systems can be used to detect and recognize traffic or other road signs to help automate and improve autonomous driving and mapping/navigation functions. In many cases, traffic signs and the information they provide (e.g., vehicle speed limits, etc.) can be important for the safe operation of road vehicles. Consequently, service providers face significant technical challenges to ensuring a high level of accuracy of performance when learning or detecting traffic signs along roadways, particularly in real-time sign detection use cases.

SOME EXAMPLE EMBODIMENTS

Therefore, there is a need for an approach for efficient and accurate traffic or road sign learning.

According to one embodiment, a computer-implemented method for traffic sign learning comprises receiving a plurality of traffic sign observations generated using sensor data collected from a plurality of vehicles. Each of the plurality of traffic sign observations includes, for instance, location data and sign property data for an observed traffic sign corresponding to said each of the plurality of traffic sign observations. The method also comprises clustering the plurality of traffic sign observations into at least one cluster based on the location data and the sign property data. The method further comprises determining a learned sign for the at least one cluster, and determining a learned sign value indicated by the learned sign based on the location data, the sign property data, or a combination of the plurality of traffic sign observations aggregated in the at least one cluster.

According to another embodiment, an apparatus for traffic sign learning comprises at least one processor, and at least one memory including computer program code for one or more computer programs, the at least one memory and the computer program code configured to, with the at least one processor, cause, at least in part, the apparatus to receive a plurality of traffic sign observations generated using sensor data collected from a plurality of vehicles. Each of the plurality of traffic sign observations includes, for instance, location data and sign property data for an observed traffic sign corresponding to said each of the plurality of traffic sign observations. The apparatus is also caused to cluster the plurality of traffic sign observations into at least one cluster based on the location data and the sign property data. The apparatus is further caused to determine a learned sign for the at least one cluster, and determine a learned sign value indicated by the learned sign based on the location data, the sign property data, or a combination of the plurality of traffic sign observations aggregated in the at least one cluster.

According to another embodiment, a non-transitory computer-readable storage for traffic sign learning medium carries one or more sequences of one or more instructions which, when executed by one or more processors, cause, at least in part, an apparatus to receive a plurality of traffic sign observations generated using sensor data collected from a plurality of vehicles. Each of the plurality of traffic sign observations includes, for instance, location data and sign property data for an observed traffic sign corresponding to said each of the plurality of traffic sign observations. The apparatus is also caused to cluster the plurality of traffic sign observations into at least one cluster based on the location data and the sign property data. The apparatus is further caused to determine a learned sign for the at least one cluster, and determine a learned sign value indicated by the learned sign based on the location data, the sign property data, or a combination of the plurality of traffic sign observations aggregated in the at least one cluster.

According to another embodiment, an apparatus for traffic sign learning comprises means for receiving a plurality of traffic sign observations generated using sensor data collected from a plurality of vehicles. Each of the plurality of traffic sign observations includes, for instance, location data and sign property data for an observed traffic sign corresponding to said each of the plurality of traffic sign observations. The apparatus also comprises means for clustering the plurality of traffic sign observations into at least one cluster based on the location data and the sign property data. The apparatus further comprises means for determining a learned sign for the at least one cluster, and determining a learned sign value indicated by the learned sign based on the location data, the sign property data, or a combination of the plurality of traffic sign observations aggregated in the at least one cluster.

According to another embodiment, a computer-implemented method for traffic sign learning comprises selecting traffic sign data from either learned traffic sign data or alternate traffic sign data based on one or more rules. The learned traffic sign data is determined based on clustering a plurality of traffic sign observations according to location data and sign property data generated using sensor data collected from a plurality of vehicles. The method also comprises providing the selected traffic sign data for presenting a mapping user interface on a device, operating an autonomous vehicle, or a combination thereof.

According to another embodiment, an apparatus for traffic sign learning comprises at least one processor, and at least one memory including computer program code for one or more computer programs, the at least one memory and the computer program code configured to, with the at least one processor, cause, at least in part, the apparatus to select traffic sign data from either learned traffic sign data or alternate traffic sign data based on one or more rules. The learned traffic sign data is determined based on clustering a plurality of traffic sign observations according to location data and sign property data generated using sensor data collected from a plurality of vehicles. The apparatus is also caused to provide the selected traffic sign data for presenting a mapping user interface on a device, operating an autonomous vehicle, or a combination thereof.

According to another embodiment, a non-transitory computer-readable storage medium for traffic sign learning carries one or more sequences of one or more instructions which, when executed by one or more processors, cause, at least in part, an apparatus to select traffic sign data from either learned traffic sign data or alternate traffic sign data based on one or more rules. The learned traffic sign data is determined based on clustering a plurality of traffic sign observations according to location data and sign property data generated using sensor data collected from a plurality of vehicles. The apparatus is also caused to provide the selected traffic sign data for presenting a mapping user interface on a device, operating an autonomous vehicle, or a combination thereof.

According to another embodiment, an apparatus for traffic sign learning comprises means for selecting traffic sign data from either learned traffic sign data or alternate traffic sign data based on one or more rules. The learned traffic sign data is determined based on clustering a plurality of traffic sign observations according to location data and sign property data generated using sensor data collected from a plurality of vehicles. The apparatus also comprises means for providing the selected traffic sign data for presenting a mapping user interface on a device, operating an autonomous vehicle, or a combination thereof.

According to another embodiment, a computer-implemented method comprises embedding a feature detection model, precomputed weights for the feature detection model, or a combination thereof in a data layer of map data representing a geographic area from which a training data set was collected to generate the feature detection model, the precomputed weights, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 4A and 4B are diagrams illustrating examples of challenges encountered with respect to traffic sign learning, according to one embodiment;

DESCRIPTION OF SOME EMBODIMENTS

Examples of a method, apparatus, and computer program for traffic sign learning are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention. Although the various embodiments are discussed with respect to learning traffic signs, it is contemplated that the embodiments described herein are also applicable to any other type of road signs and or other road furniture that are observable or detectable from a roadway.

Figure 1:
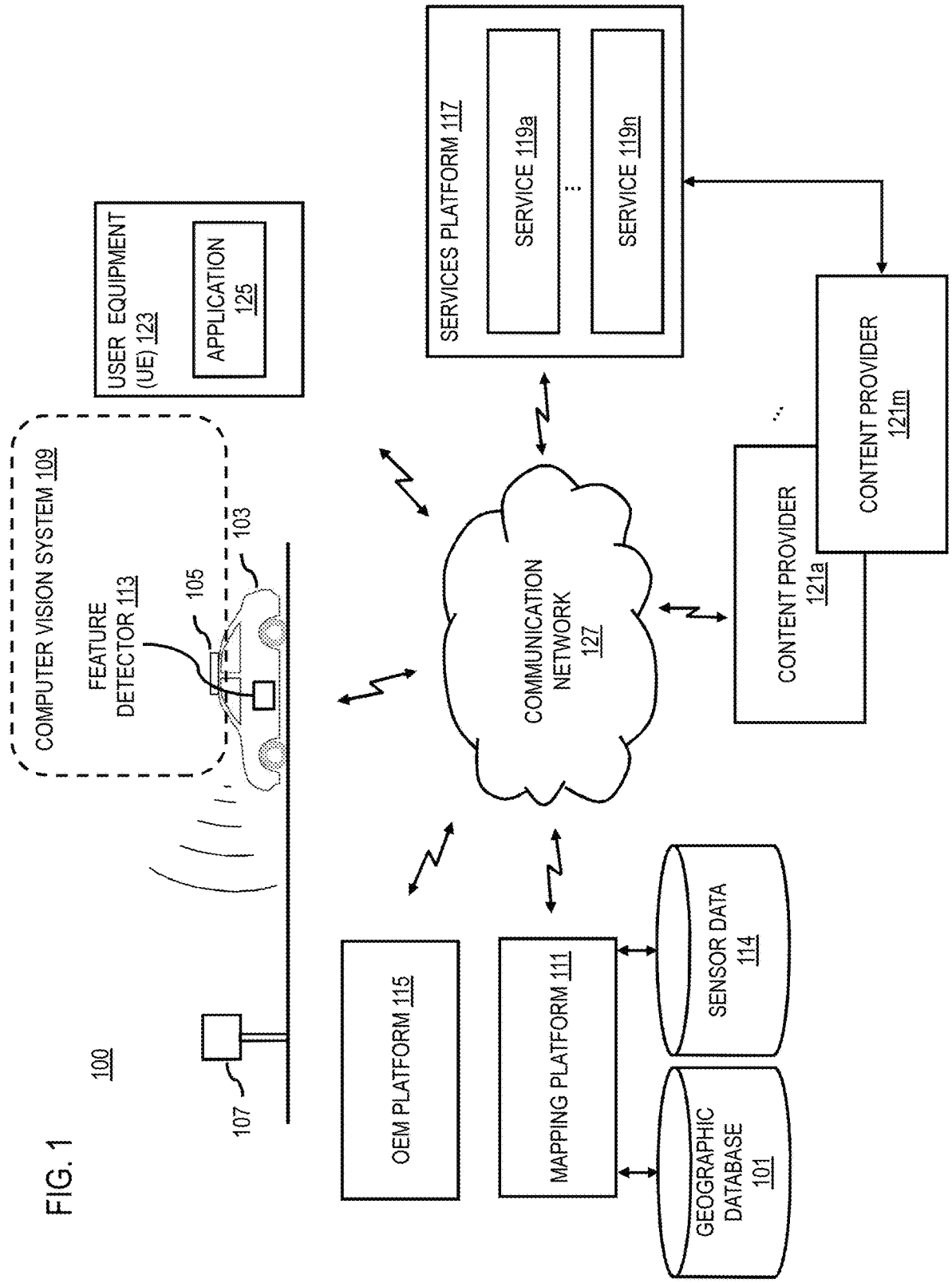
FIG. 1 is a diagram of a system capable of traffic sign learning, according to one embodiment.

FIG. 1 is a diagram of a system capable of traffic sign learning, according to one embodiment. The automotive industry is focused on delivering safer, more comfortable and more efficient mobility solutions. The path towards these objectives include, for instance, automation of many functions currently performed by drivers as a way to reduce the burden asked of drivers in today's busy and highly regulated road environment, while improving reaction times and decision making. In one embodiment, digital maps (e.g., a geographic database 101) provide information complementary to on-board sensors and driver cognition to enhance the assistance functions implemented in a vehicle 103. For example, the geographic database 101 can be a source of road attributes or other characteristics (e.g., speed limits, hazard warnings, road conditions, etc.) that would traditionally be conveyed to drivers via road signs. Therefore, the geographic database 101 can be important for enabling these driving automation use-cases as a source of road attributes or characteristics that can be retrieved automatically by the vehicles 103.

However, to support such use-cases, map service providers and automobile manufacturers (e.g., Original Equipment Manufacturers (OEMs)) face significant technical challenges and resource constraints to acquiring road attribute values determined for road signs for a wide geographic area and at target accuracy levels. This is because many road signs (e.g., traffic speed signs in particular) can change quickly over time (e.g., due to construction, temporary closures, new roads, etc.) and become obsolete, thereby potentially degrading performance and/or safety for autonomous driving use-cases.

Historically, map service providers maintain and deploy a fleet of dedicated mapping vehicles to map roads and their corresponding attributes and/or characteristics (e.g., including attributes recognized from road signs). Map service providers generally target 100% or near 100% accuracy to ensure the highest levels of safety and data quality for end users (e.g., consumer vehicles 103). To achieve the target accuracy or quality levels, map service providers often ensure that their mapping vehicles are equipped with highly accurate and expensive sensors that are generally capable of higher performance than normally included in consumer vehicles 103. The use of specialized mapping vehicles further contributes to the inability of map service providers to provide a fleet of sufficient size to map large areas in real-time. As a result, traditional fleets of specialized mapping vehicles can collect only enough mapping data to provide relatively infrequent map updates (e.g., quarterly updates).

To address this problem, the system 100 of FIG. 1 can use sensor data collected from consumer vehicles 103 in addition or as an alternate to dedicated fleets of mapping vehicles to determine, for instance, road attribute values from road signs 107 (e.g., a speed limit sign). In one embodiment, by using data from sensors 105 or computer vision systems 109 of customer vehicles 103, the system 100 (e.g., via a mapping platform 111) can obtain enough sensor data to update road attributes (e.g., road sign data) of the geographic database 101 and/or other equivalent road sign database more quickly than can be achieved using specialized mapping vehicles. This is because the penetration ratio of regular customer vehicles 103 is higher than the penetration ratio of specialized mapping vehicles. In other words, there are many more customer vehicles 103 operating in a road network capable to detecting and recognizing road signs at any given time than there are specialized mapping vehicles. Achieving number parity between customer vehicles 103 and specialized mapping vehicles would be cost and resource prohibitive.

In one embodiment, depending on the number of participating customer vehicles 103 (e.g., thousands of vehicles 103 or more), the system 100 can learn and/or update road signs 107 and their respective road attribute values (e.g., traffic speed limit values) on the order of hours or in near real-time versus the quarterly updates (e.g., on the order of months) achieved using less numerous specialized mapping vehicles.

However, the use of customer vehicles 103 can also present additional significant technical challenges, particularly with respect to ensuring that target levels of accuracy (e.g., near 100% or any other predetermined level of accuracy) of the learned road attribute (e.g., learned road signs and their sign values) can be achieved, this lower accuracy is due to the fact that customer vehicles generally have low cost sensors compared to specialized mapping vehicles. As noted above, while specialized mapping vehicles are equipped with higher performing sensors to detect and recognize road signs 107 at target levels of accuracy, customer vehicles 103 are usually equipped with a less capable sensors 105 or sensors 105 that are not specifically configured to achieve the accuracy levels targeted by map service providers. Moreover, there can be considerable variability in sensor performance capabilities, characteristics, setups, etc. between different models of consumer vehicles 103 (e.g., even when the models are from the same manufacturer or OEM), thereby leading to potentially higher uncertainty and less accuracy.

To address the technical challenges associated with collecting sensor data from consumer vehicles 103 for traffic sign recognition (TSR) or traffic sign learning, the system 100 introduces a capability to learn a traffic sign (e.g., a speed limit sign) and the sign's property (e.g., a speed limit value depicted by a speed limit sign) located in a road network by using multiple observations from different vehicles (e.g., consumer vehicles 103 and/or specialized mapping vehicles). In one embodiment, TSR observations (e.g. sensor data reports) from multiple consumer vehicles 103 are map matched to road link records of the geographic database 101 and spatially clustered according to detected sign properties. For example, TSR observations that are close in space (e.g., within a threshold distance of each other) and have the same or similar properties are aggregated into a cluster. In one embodiment, a learned sign's property or characteristic (e.g., a road attribute value indicated by the learned sign such as a speed limit value) can then be determined based on the property of the observations in a cluster (e.g., a consensus property, unanimous property, etc. of the cluster). This learned road attribute value (e.g., speed limit value) can be associated with one or more road links corresponding to or near the location of the learned sign. In one embodiment, the location of the learned sign can be learned by determining a mean location of observations in a cluster (or any other equivalent or similar function to a mean function).

Figure 2:
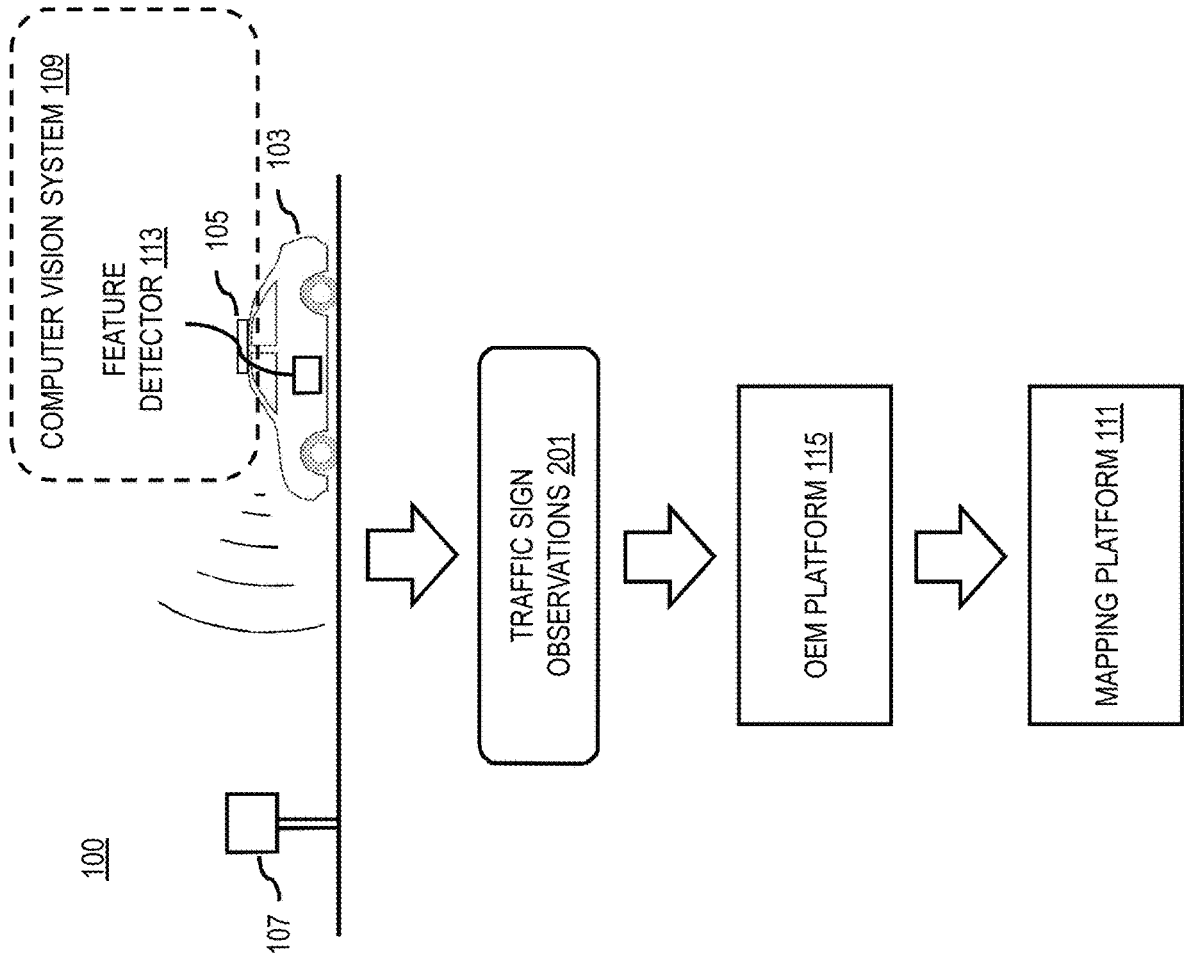
FIG. 2 is a diagram illustrating an example of reporting traffic sign observations from a vehicle, according to one embodiment.

It is noted that most of the previous work on sign detection is focused on image recognition. In contrast, the embodiments of the system 100 described herein do not focus on image recognition. Instead, the embodiments focus on how to determine when multiple image recognition observations made by vehicles 103 provide sufficient accuracy or confidence for the system 100 to designate that a sign and the sign's property (e.g., a sign value) can be detected to update road or traffic sign data in the geographic database 101 (i.e., the sign or sign property has been "learned" with sufficient accuracy or confidence). For example, as shown in FIG. 2, the vehicles 103 that contribute TSR observations 201 to the system 100 have their own respective computer vision systems 109. These computer vision systems 109 can be any type of sign detection system known in the art or equivalent, for instance, comprising individual image recognition software or feature detectors 113 (e.g., machine learning or pattern matching models) and sensors 105 (e.g., optical sensors, radar sensors, LiDAR sensors, location sensors, etc.) that can detect and recognize road or traffic signs and their attributes observed within the field of the vision of the sensors 105.

In one embodiment, the TSR observations 201 from vehicles 103 for a recognized sign 107 can include, but are not limited, to any of the following data fields: a sign value, sign type, latitude, longitude, heading, altitude, and/or side of road the sign was detected. The information may contain location information of the vehicle itself and position information such as offsets in meters from the vehicle's location to represent the sign's location. The TSR observations 201 can be transmitted from the consumer vehicles 103 to the mapping platform 111 through an OEM platform 115 or directly from the consumer vehicles 103 to the mapping platform 111. In one embodiment, the OEM platform 115 can be operated by a vehicle manufacturer and can aggregate TSR observations 201 and/or sensor data collected from the vehicles 103 that are produced by the manufacturer. The OEM platform 115 can pre-process (e.g., anonymize, normalize, etc.) the TSR observations 201 before transmitting the processed TSR observations 201 to the mapping platform 111 (e.g., operated by a map service provider). Although FIG. 2 depicts an example with one OEM platform 115, the mapping platform 111 can have connectivity to multiple OEM platforms 115 (e.g., each corresponding to a different vehicle manufacturer) to collect TSR observations 201.

In one embodiment, given TSR observations 201 from multiple vehicles 103 (or multiple OEM platforms 115) in a sensor chain (e.g., stored in sensor database 114), the system 100 can cluster the TSR observations 201 according to location and one or more detected sign properties (e.g., a sign value, sign type, etc.) to learn a newly placed sign in near-real-time (e.g., within hours or better of sensor data collection). A newly placed sign is determined based on current clusters and a comparison to an earlier map such as a map of signs from the day before. For example, if the comparison indicates that a learned sign was not present in the earlier map, the system 100 can designate that learned sign as a newly placed sign. The system 100 then identifies the road link to which the learned sign or sign property or value applies, and updates the road link record of the geographic database 101 corresponding to the identified road link accordingly. In one embodiment, the learned sign data of the geographic database 101 can then be used for applications such as autonomous driving.

Figure 3:
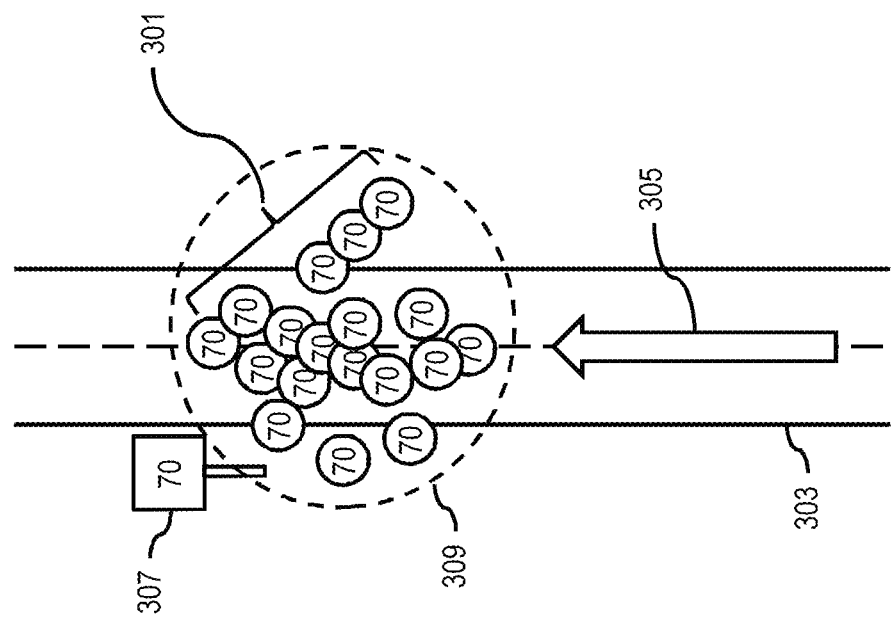
FIG. 3 is diagram illustrating a clustering of traffic sign observations, according to one embodiment.

An example of this clustering process is illustrated in FIG. 3. In the example of FIG. 3, multiple TSR observations 301 are received from vehicles 103 (not shown) traveling on the road segment 303. The road segment 303 has a heading indicated by the arrow 305 and has a speed limit sign 307 with a posted speed limit of 70 mph (e.g., the sign 705's value) located on the left side of the road segment 303. Each of the TSR observations 301 are generated based on sensor data from a computer vision system 109 of each reporting vehicle 103. As each respective reporting vehicle 103 approaches the speed limit sign 307, the sign is detected, and its properties are detected as reported as a respective TSR observation 301. For example, each of the TSR observation can identify the sign type (e.g., a speed limit sign), the sign's value (e.g., 70 mph), location of either the reporting vehicle 103 or detected sign, heading of the vehicle 103 or road segment 303, the side of the road 303 where the sign was detected). The mapping platform 111 of the system 100 can collect the TSR observations 301 (e.g., over a predetermined period of time such as 24 hours) for spatial clustering into a cluster 309. The mapping platform 111 identifies a learned sign and sign properties from the cluster 309 (e.g., a learned speed limit sign with a learned sign value 70 mph). The mapping platform 111 can then determine the road link record or records of the geographic database 101 corresponding to the road segment 303 and update the attributes of the determined road link records to indicate the learned sign and any of the learned sign values.

Figure 4A:
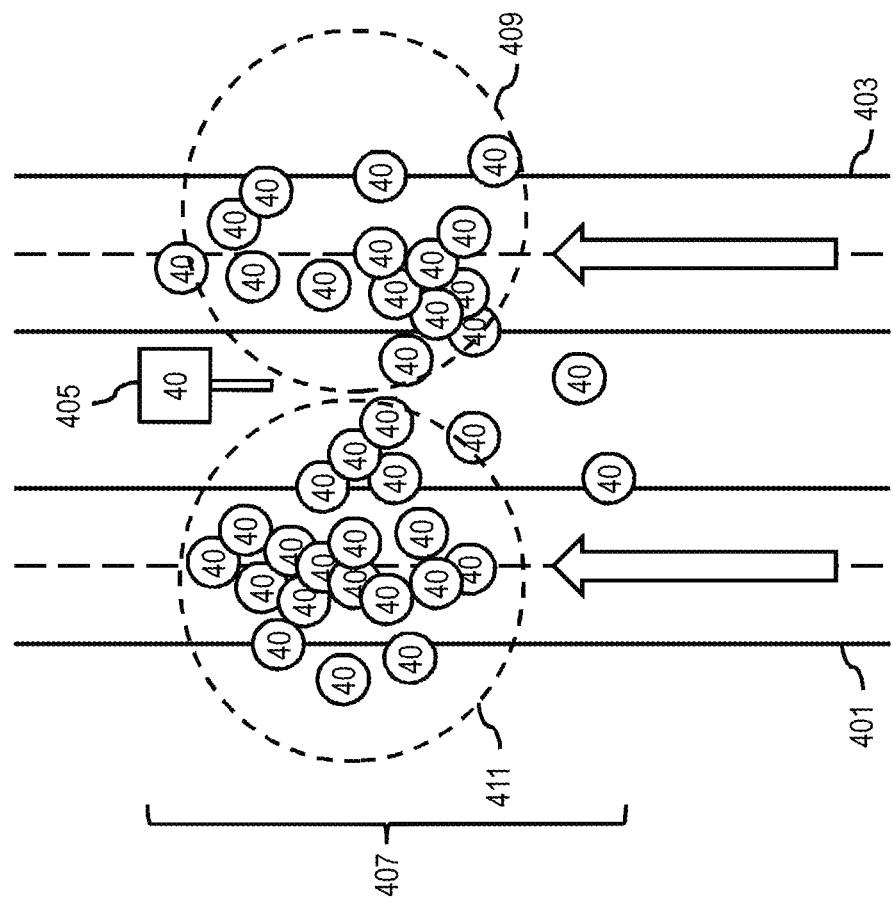

Under some scenarios, learning traffic signs and matching them correctly to road links of the geographic database 101 can present additional technical challenges and problems. These challenges can arise from map topology (e.g., in the vicinity of ramps, parallel roads, complex intersections, etc.), sign characteristics (e.g., variable speed signs, signs that are not speed signs but are misclassified as speed signs, etc.), and/or other similar conditions. For example, FIG. 4A illustrates a scenario in which the map topology includes a main road segment 401 next to a side road segment 403 that run in parallel with the same heading. As shown, there is a speed limit sign 405 located between the main road segment 401 and the side road segment 403. Vehicles 103 traveling on both roads 401 and 403 can observe and detect the speed limit sign 405. As a result, TSR observations 407 of the sign 405 are located on both the main road segment 401 and the side road segment 403 because the computer vision systems 109 typically report the location of corresponding vehicles when the sign 405 was observed and not the location of the sign 405. As a result, there are two spatial clusters of TSR observations 407: (1) a cluster 409 on the side road segment 403 of TSR observations 407 with reported sign values of 40 mph, and (2) a cluster 411 on the main road segment 401 of TSR observations 407 with reported sign values of 40 mph. However, in this example, the sign 405 is only applicable to the side road segment 403. This multiple cluster problem can also happen in the vicinity of ramps or map road topologies where the system 100 may aggregate several clusters because a given sign is seen by vehicles 103 that are driving on roads where the observed sign is not applicable.

In another scenario, as shown in FIG. 4B, reporting vehicles 103 can potentially misclassify and report a TSR observation that is not related to an actual road or traffic sign. As shown in the example of FIG. 4B, a reporting consumer vehicle 103 drives on a road segment 421. The computer vision system of the vehicle 103 misclassifies an image of a numerical marking 425 (e.g., an identification number "100") on the lower left of a parked truck 423 as a traffic speed limit sign with a speed limit value of 100 mph. As a result of this misclassification, the vehicle 103 generates a TSR observation 427 to report that it has detected a speed limit sign with a sign value of 100 mph, and transmit the TSR observation 427 in the sensor chain of the system 100.

To address these additional problems presented the scenarios discussed above among others, the system 100 can include additional post processing on learned signs and sign property data to make corrections and further reduce uncertainties.

In one embodiment, the geographic database 101 may include road attributes (e.g., traffic speed limits) available from multiple sources including attribute values learned from clustered TSR observations determined according to the various embodiments described herein. For example, in addition to the learned attributes (e.g., learned speed limits), each road link record may also have a previously recorded default speed limit value (e.g., a High Definition (HD) map speed limit value determined when the geographic database 101 was created or last updated using traditional means such as from the quarterly updates generated from sensor data collected from the specialized mapping vehicles). In addition, other third-party road attribute data providers may also provide real-time road attributes (e.g., traffic speed limit data). In some cases, the road attribute values from these different sources can conflict or differ significantly, thereby presenting technical challenges related to resolving these differences. To address these challenges, the system 100 further introduces a capability to apply rules or criteria for determining the sign values (e.g., road attribute values) that the system 100 will display or use (e.g., with respect to presenting to a driver or controlling an autonomous vehicle) for a road link.

Figure 5:
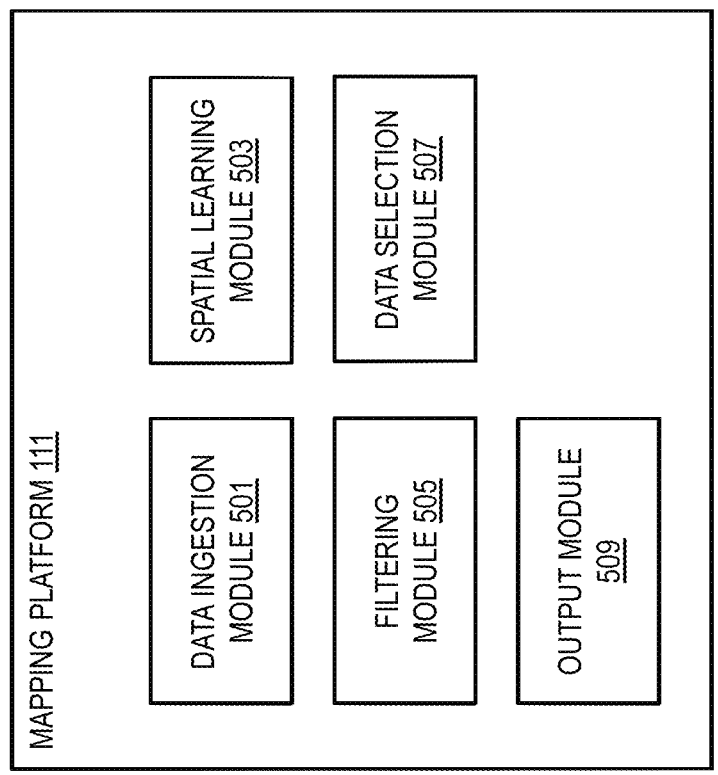
FIG. 5 is a diagram of the components of a mapping platform capable of traffic sign learning, according to one embodiment.

In one embodiment, as noted above, the mapping platform 111 can perform one or more functions related to traffic sign learning according to the embodiments described herein. FIG. 5 is a diagram of the components of the mapping platform 111, according to one embodiment. By way of example, the mapping platform 111 may include one or more components for traffic sign learning. In one embodiment, the mapping platform 111 includes a data ingestion module 501, spatial learning module 503, filtering module 505, data selection module 507, and output module 509. It is contemplated that the functions of these components may be combined in one or more components or performed by other components with similar functionalities (e.g., the OEM platform 115, a services platform 117, any of the services 119a-119n of the services platform 117, etc.). The above presented modules and components of the mapping platform 111 can be implemented in hardware, firmware, software, or a combination thereof. Though depicted as a separate entity in FIG. 1, it is contemplated that the mapping platform 111 may be implemented as a module of any of the components of the system 100. In another embodiment, one or more of the modules 501-509 may be implemented as a cloud-based service, local service, native application, or combination thereof. The functions of the mapping platform 111 and modules 501-509 are discussed with respect to FIGS. 6-10 below.

As discussed above, one of the technical challenges addressed by the system 100 and the mapping platform 111 is how to learn traffic signs from multiple image recognition observations of traffic signs (e.g., TSR observations) and not of the image recognition or classification technology itself. In other words, the reporting consumer or OEM vehicles 103 have any state of art computer vision system 109 or image recognition software that can be propriety to OEMs. The mapping platform 111 can then use the image recognition results from these computer vision systems 109 to learn new signs and their respective properties to use in various uses cases (e.g., map updates, driver aid, autonomous driving, etc.). Because of the high uncertainty with image recognition, the mapping platform 111 uses multiple TSR observations from different consumer or OEM vehicles 103 to learn a sign.

Figure 6:
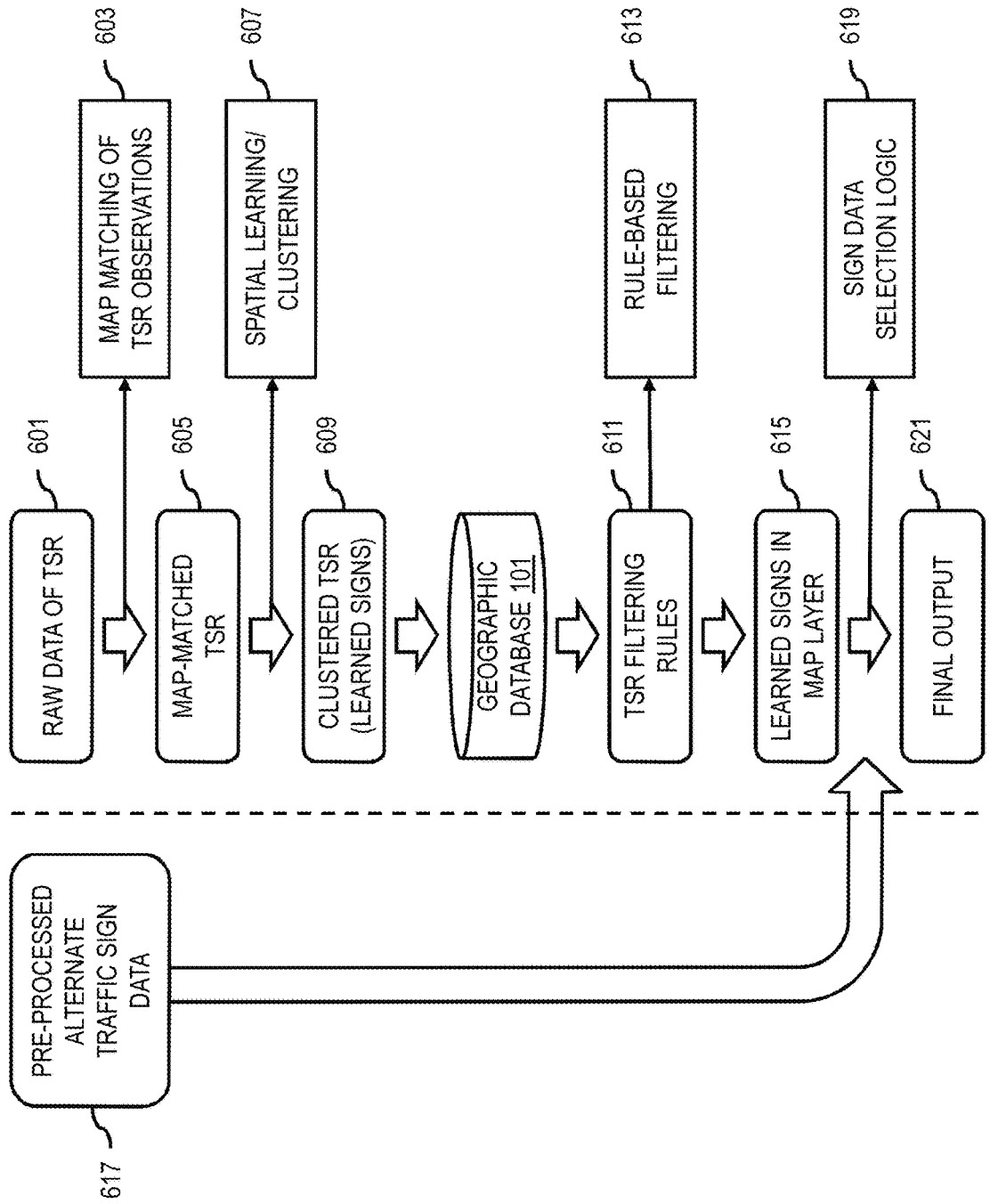
FIG. 6 is a diagram of a traffic sign learning pipeline, according to one embodiment.
Figure 13:
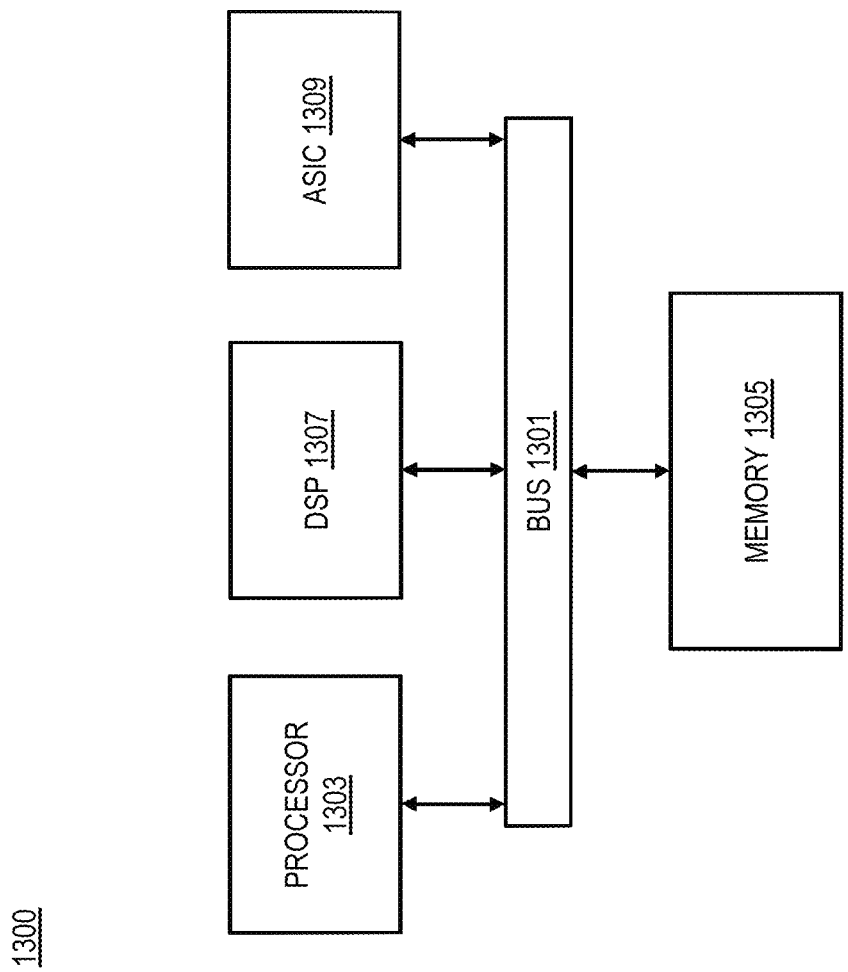
FIG. 13 is a diagram of a chip set that can be used to implement an embodiment.

FIG. 6 is a diagram of a traffic sign learning pipeline 601, according to one embodiment. In one embodiment, the mapping platform 111 and/or any of its modules 501-509 may perform one or more portions of the pipeline process 600 and may be implemented in, for instance, a chip set including a processor and a memory as shown in FIG. 13. As such, the mapping platform 111 and/or the modules 501-509 can provide means for accomplishing various parts of the process 600. In addition or alternatively, the OEM platform 115, services platform 117, and/or one or more of the services 119a-119n (also collectively referred to as services 119) may perform any combination of the steps of the process 600 in combination with the mapping platform 111, or as standalone components. Although the process 600 is illustrated and described as a sequence of steps, it is contemplated that various embodiments of the process 600 may be performed in any order or combination and need not include all of the illustrated steps.

At process 601, the data ingestion module 501 collects raw TSR observation data. In one embodiment, vehicles 103 provide raw traffic sign recognition data (e.g., TSR observations) as they drive. The vehicles 103 can provide information such as sign type, sign value, vehicle location (e.g., latitude, longitude, heading, speed, etc.) when it observed the sign, side of road and time stamp. These observations are then sent to the sensor chain (e.g., cloud) through the OEM platform 115 or directly to sensor database 114 of the mapping platform 111 for processing by the data ingestion module 501. In one embodiment, raw TSR observation data for a predetermined period of time (e.g., for at least X hours) is collected or extracted from the sensor chain. For example, the data ingestion module 501 can use X=24, this means the mapping platform 111 processes TSR observations to learn new signs and sign properties every 24 hours.

At process 603, the data ingestion module 501 map matches the retrieved raw TSR observation data based, for instance, on the digital map data or a road network stored in the geographic database 101. In other words, the map matching process 603 associates the TSR observations to a road network so that each TSR observation can be link to a particular road link or road segment of the road network. In one embodiment, for map matching, the location data in each TSR observation record (e.g., latitude, longitude, speed, heading, and/or the like of the reporting vehicle 103) are considered. It is contemplated that any map-matching process, means, algorithm, etc. (e.g., path-based map matching) known in the art or equivalent can be used in embodiments of the process 603 to generate map-matched TSR observation data 605.

At process 607, the spatial learning module 503 can then cluster the map-matched TSR observation data 605 to learn signs and their respective sign properties (e.g., sign value, location, etc.). In one embodiment, the process 607 comprises the spatial learning stage and any unsupervised learning technique in known in the art can be used to perform the learning. In this stage, the spatial learning module 503 can use a density-based clustering process or equivalent to aggregate similar map-matched TSR observations 605. By way of example, any density-based clustering algorithm (e.g. DB-SCAN) or equivalent known in the art can be used. To perform the clustering, the spatial learning module 503 can designate default clustering parameters. The clustering parameters can include, but are not limited to: a minimum number of TSR observations per cluster, distance threshold for a TSR observation to be included in a cluster, and/or the like. For example, the spatial learning module 503 can require at least three TSR observations that are within a distance threshold of 15 m to create a cluster. In other words, clustering aggregates the TSR observations that are close in space and have the same or similar properties (e.g. sign value, side of the road, etc.). In one embodiment, the output of the process 607 is a set of clustered TSR data 609 (e.g., consisting of one or more clusters corresponding respectively to a learned sign) as well as the learned sign's value/other properties and the learned sign's location. In one embodiment, the location is the mean location of TSR observations 605 that are in a cluster. In addition, similar learned signs or clusters that are within a cluster distance threshold (e.g., within 20 m) and are located on the same road link or adjacent links can be merged.

In one embodiment, the spatial learning module 503 can send the learned sign data (e.g., the clustered TSR data 609) to the geographic database 101 or equivalent for storage. In one embodiment, the learned sign data can be stored in a separate layer of the geographic database 101 to distinguish the data from other sources of sign data or road attributes that may already be stored in the geographic database 101 (e.g., HD road attribute data) or available from external third-parties (e.g., services platform 117, services 119a-119n, content providers 121a-121m, etc.). In one embodiment, the geographic database 101 or other database where the learned sign data is stored can be queried to determine if a given sign is newly placed on the road.

As discussed above, due to map uncertainties created by road map topology (e.g., ramps, parallel roads, etc.) and other factors such as potential misclassification of non-traffic signs as traffic signs, the filtering module 505 can apply one or more post processing steps to further improve the quality of accuracy of the learned sign data resulting from the processes described above. In one embodiment, the filtering module 505 can use a custom TSR filtering rule set 611 to perform a rule-based filtering process 613 to make corrections or otherwise reduce uncertainties in the learned sign data. By way of the example, the filtering rule set 611 can include rules for correcting the locations of learned signs in for complex road geometries such as near ramps, parallel roads, intersections, or any other locations where a traffic sign can be observed by vehicles 103 traveling on different nearby road links or segments. The filtering rule set 611 can also provide rules for determining when learned signs or sing values may be potential misclassifications, rules for how to propagate learned sign values or road attributes indicated by the learned sign values to other nearby road links, rules for determining a lateral or longitudinal offset from a location of the cluster to a location of the sign learned from a cluster (e.g., because TSR observations in the clusters usually include the location of the vehicle when a sign is observed and not the location of the sign itself), and/or the like. It is noted that the rules discussed above are provided by way of illustration and not as limitations, and it is contemplated that the filtering module 505 can use any rules or other processes to correct or reduce the uncertainty of learned sign data. After post processing, the filtering module 505 can send the filtered learned signed data 615 to a separate or production map layer of the geographic database 101 or equivalent.

In one embodiment, the mapping platform 111 can also receive or have access to other sources (e.g., third-party sources) of pre-processed alternate traffic sign data 617 for one or more areas mapped in the geographic database 101. In other words, the mapping platform 111 could also get pre-processed sign data (e.g., already map matched and clustered) from other near-real-time traffic sign services (e.g., a services platform 117, services 119a-119n, content providers 121a-121m, etc.). In one embodiment, the pre-processed alternate traffic sign data 617 are sent to a map extension filter layer (e.g., of the geographic database 101) where rules for determining what sign value to use for the specific link can be applied. For example, when multiple data sources of traffic sign data for the same road link are available, the data selection module 507 can use a sign data selection logic process 619 to apply the data selection rules to select the what sign values to use (e.g., to display for a given link, to drive a vehicle autonomously on a given link, etc.). By way of example, the rules can include, but are not limited to: (1) if a given link does not contains a sign value (e.g., speed limit) learned from TSR observations according to the embodiments described herein, the data selection module 507 can interact with the output module 509 to report the default HD map road attribute (e.g., default speed limit previously stored in the geographic database 101) for that link as the final output 621; (2) if a given link contains a TSR observation learned sign value (e.g. speed limit), the data selection module 507 instructs the output module 509 to report the TSR observation learned sign value (e.g., a learned speed limit) for that link as the final output 621; and (3) if another real time traffic sign service (e.g., a services platform 117, services 119a-119n, content provider 121a-121m, etc.) is also sending its traffic sign data to the mapping platform 111, the rules for deciding what sign value (e.g., speed limit) to report for a given will take all three sources into consideration (e.g., based on historical accuracy, data freshness, etc.) to provide the final output 621.

Figure 7:
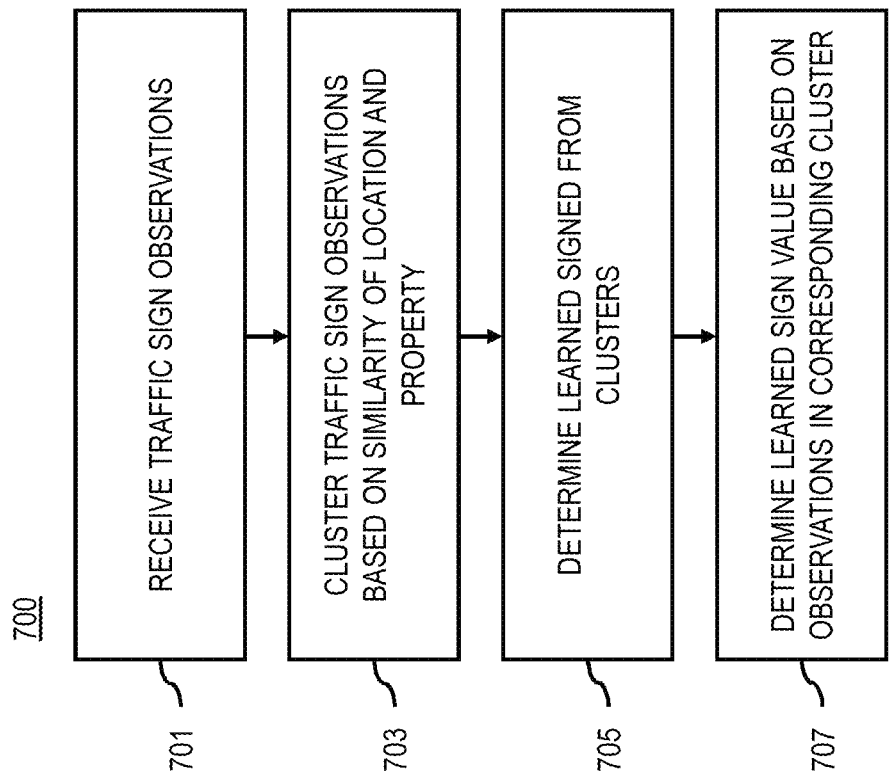
FIG. 7 is a flowchart of a process for clustering traffic sign observations to learn traffic signs and/or traffic sign values, according to one embodiment.

FIG. 7 is a flowchart that provides additional description of the process for clustering traffic sign observations to learn traffic signs and/or traffic sign values, according to one embodiment. In one embodiment, the mapping platform 111 and/or any of its modules 501-509 may perform one or more portions of the process 700 and may be implemented in, for instance, a chip set including a processor and a memory as shown in FIG. 13. As such, the mapping platform 111 and/or the modules 501-509 can provide means for accomplishing various parts of the process 700. In addition or alternatively, the OEM platform 115, services platform 117, and/or one or more of the services 119a-119n (also collectively referred to as services 119) may perform any combination of the steps of the process 700 in combination with the mapping platform 111, or as standalone components. Although the process 700 is illustrated and described as a sequence of steps, it is contemplated that various embodiments of the process 700 may be performed in any order or combination and need not include all of the illustrated steps.

In step 701, the mapping platform 111 receives a plurality of traffic sign observations (e.g., TSR observations) generated using sensor data collected from a plurality of vehicles 103 (e.g., consumer or OEM vehicles). As previously discussed, each of the TSR observations includes data fields such as location data and other sign property data for an observed traffic sign corresponding to each TSR observation. By way of example, the sign property data can include, but is not limited to, a sign value, a sign type, a side of a road on which the observed traffic sign is detected, a time stamp, or a combination thereof.

A sign value refers to a value indicated or displayed on the observed traffic sign. For example, if the traffic sign is a speed limit sign, the sign value would be the speed limit indicated on the speed limit sign. A sign type can be used to indicate different types of traffic signs (e.g., speed limit sign versus parking signs versus stop signs, etc.) as well as different categories of signs within the same sign type. For example, a speed limit sign type can include signs that have explicitly displayed speed limit values (i.e., the speed limit value is presented directly on the sign) or that implies a speed limit value. A sign that implies a speed limit value, for instance, may indicate "End of Highway" to indicate a return to a default speed limit for given area or jurisdiction. Other signs might indicate "School Zone" or "End of School Zone" to indicate when default school zone speed limits should begin or end. In another example, a sign type may also indicate whether a traffic or speed limit has a fixed or variable value. For example, a fixed speed limit sign will always have one speed limit value for all time period, while a variable speed limit can display different speed limits depending on time of day, level of traffic congestion, etc.

The data field for which side of the road that a traffic sign was observed can also be referred to as the lateral offset of the sign with respect to the road. For example, this data field records whether the observed traffic sign was detected on the left side, right side of the road, or other position of the traffic sign with respect to the road (e.g., overhead sign, sign painted onto the road surface, etc.). In addition, each TSR observation includes location data indicating, for instance, a location (e.g., in latitude and longitude), a heading, a speed, or a combination thereof of a reporting vehicle 103 when the observed traffic sign is detected.

In step 703, the mapping platform 111 clusters the plurality of map matched traffic speed sign observations into at least one cluster based on the location data (e.g. latitude, longitude, map match link identification, etc.) and the sign property data. As previously described, the mapping platform 111 can use any clustering technique (e.g., DBSCAN, k-means, etc.) to spatially cluster TSR observations into one or more clusters based on similarity of location and property. The mapping platform 111, for instance, can group TSR observations that are located within a threshold distance or proximity of each other (e.g., within 15 meters) and whose detected properties (e.g., sign values) are determined to be the same or similar to within a similarity range. In one embodiment, the clustering is initiated after predetermined intervals of TSR observations are collected (e.g., every 24 hours or every X number of hours). In this way, the TSR observations are processed according to time epochs corresponding to the data collection time intervals. In addition or alternatively, the clustering can be triggered based on collecting a minimum number of TSR observations from a given area. For example, after a minimum of 3 or a minimum of Y number of TSR observations for a given road link or segment, the TSR observations can be processed by the mapping platform 111. The output of step 703 can include one or more clusters of TSR observations from which traffic sign data can be learned.

In step 705, the mapping platform 111 determines a learned sign for at least one of the clusters generated in step 703. In addition or alternatively, the mapping platform 111 can determine a learned sign value indicated by the learned sign based the location data, the sign property data, or a combination for the plurality of traffic sign observations aggregated in the cluster of interest (step 707). In one embodiment, the learning can be performed using any supervised learning technique (e.g., machine learning, statistical pattern matching, etc.) or equivalent. For example, in supervised learning, ground truth data comprising clusters of TSR observations annotated with known traffic signs and their respective properties can be used to train a machine learning model (e.g., neural networks, support vector machines (SVM), decision trees, RandomForest, etc.) to predict or learn traffic signs and sign properties given a feature set constructed of the properties of the clustered TSR observations. The mapping platform 111 can then construct a feature set of properties (e.g., number of observations, location/heading/speed of reporting vehicles 103, detected sign properties, etc.) for a TSR cluster of interest. This constructed cluster feature set can then be used as an input feature set to the trained machine learning model to learn signs and/or sign values/properties from the cluster TSR observations.

In one embodiment, the mapping platform 111 can also determine a confidence value, an accuracy level, or a combination thereof for the learned sign, the learned sign value, or a combination thereof. For example, the supervised learning process described about is generally a probabilistic classification process that can also output a confidence metric indicating a likelihood that a learned sign represents an actual sign in the road network based on the input feature set of the TSR cluster. In one embodiment, accuracy level can be determined by validating at least a subset of the learned sign results through a separate process (e.g., by sending a mapping vehicle or service personnel to the learned sign's location to verify the learned sign and/or its properties). The accuracy level can then be calculated based on the percentage of learned signs that match independent observation of the sign. It is noted that the processes for determining the confidence value and the accuracy level are provided by way of illustration and not as limitations. It is contemplated that the mapping platform 111 can use any equivalent means known in the art to assess the confidence level and/or accuracy level of the learned sign data. In one embodiment, the confidence value and/or accuracy level can be used for selecting between available traffic sign data for a given road link as previously described with respect to FIG. 6 and further described below with respect to FIG. 8.

Figure 8:
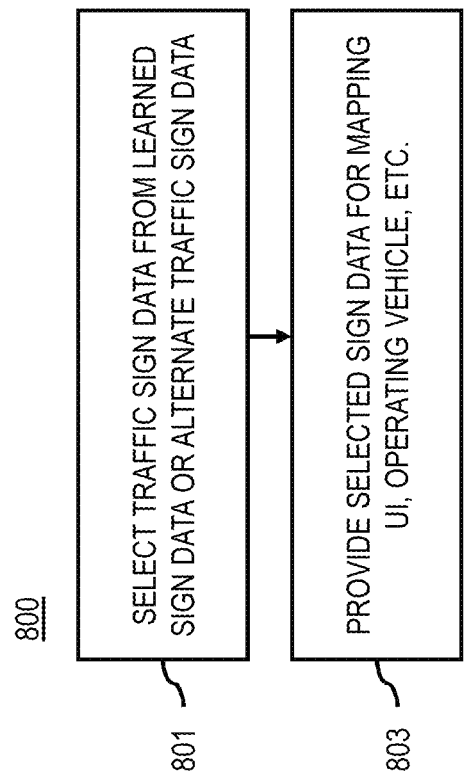
FIG. 8 is a flowchart of a process for selecting whether to provide learned traffic data as an output of a mapping platform, according to one embodiment.

FIG. 8 is a flowchart that provides additional description of the process for selecting sign data from among multiple available data sources, according to one embodiment. In one embodiment, the mapping platform 111 and/or any of its modules 501-509 may perform one or more portions of the process 800 and may be implemented in, for instance, a chip set including a processor and a memory as shown in FIG. 13. As such, the mapping platform 111 and/or the modules 501-509 can provide means for accomplishing various parts of the process 800. In addition or alternatively, the OEM platform 115, services platform 117, and/or one or more of the services 119a-119n (also collectively referred to as services 119) may perform any combination of the steps of the process 800 in combination with the mapping platform 111, or as standalone components. Although the process 800 is illustrated and described as a sequence of steps, it is contemplated that various embodiments of the process 800 may be performed in any order or combination and need not include all of the illustrated steps.

As described above, in some embodiments, the mapping platform 111 may have access to multiple sources of traffic sign data. These sources can include, but are not limited to: (1) the learned traffic sign data generated according to the embodiments described above; (2) traffic sign data generated using traditional means (e.g., fleets of mapping vehicles) during the creation of, for instance, the traditional HD map data stored in the geographic database 101; (3) third-party providers of real-time traffic sign data; and/or the like. As used herein, the term "alternate" traffic sign data refers to any traffic sign data or source of traffic sign data that is not the learned traffic sign data created from clustering TSR observations as described in the various embodiments. In addition, the alternate data sources can include both sources internal to the geographic database 101 (e.g., default traffic sign data or attributes such as those stored in HD map data of the geographic database 101 for a given road link separate from the learned traffic sign data stored in the geographic database 101 for the same road link) as well as sources external to the geographic database 101 (e.g., third party providers such as the services platform 117, services 119, and/or content providers 121). As a result, the mapping platform 111 can face significant technical challenges to ensuring data consistency when using traffic sign data that can be potentially conflicting among the various different available data sources. The process 800 addresses these technical challenges.

In step 801, the mapping platform 111 can select traffic sign data to use (e.g., to present to a driver, control autonomous driving, etc.) from either learned traffic sign data or alternate traffic sign data based on one or more rules. In one embodiment, these data selection rules can be stored in a data layer of the geographic data stored in the geographic database 111 (e.g., in an HD map extension filter layer). In this way, the mapping platform 111 can receive alternate sources of traffic sign data (e.g., third-party pre-processed traffic sign data) and send the alternate learned signed data to the HD map extension filter where the one or more data selection rules are applied. The application of the rules results in an output comprising a selected set of learned sign data comprising any individual source of traffic sign data or a combination of the learned sign data generated by the mapping platform 111 and/or one or more of the alternate traffic sign data. As noted, in one embodiment, the learned traffic sign data generated by the mapping platform 111 is determined based on clustering a plurality of traffic sign observations according to location data and sign property data generated using sensor data collected from a plurality of vehicles.

It is contemplated that the rules can based on any criterion or condition (e.g., from simple to complex hierarchies of criteria/conditions). In one embodiment, the mapping platform 111 can apply a simple decision rule to perform select from available data sources. For example, in a use case where the mapping platform 111 selects between learned traffic sign data and previously stored or default traffic sign data in the geographic database 101, the mapping platform 111 can apply a rule that selects the previously stored traffic sign data only when the learned traffic sign data is not available for a given link. With respect to applying this rule for a speed limit attribute, for instance, the mapping platform 111 will select an HD map stored speed limit as the final output for the given road link when the given road link does not contain a learned TSR-based speed limit. Similarly, in a use case where the mapping platform selects from between the learned signed data and any available alternate source in general, the mapping platform 111 can apply a rule that always selects the learned sign data over any other alternate data source if the learned sign data (e.g., TSR-based traffic sign data) is available for the given road link. The favoring of the learned traffic sign data, for instance, is based on an assumption that the because the learned traffic sign data can be generated at a much higher frequency (e.g., every 24 hours or every X hours) than the stored sign data (e.g., HD map data), the learned traffic sign may have a higher likelihood of representing current conditions.

In a more complex embodiment where the alternate traffic sign data is available from stored default data as well as at least one alternate traffic sign service (e.g., a third-party real-time provider), the mapping platform 111 can apply rules that take all three or more of the available data sources into consideration. In other words, the mapping platform 111 can apply data selection rules that select from among the alternate traffic sign data, the learned traffic sign data, and a traffic sign attribute stored for the road link the geographic database 101. For example, in this case, the selecting of the traffic sign data can be based on a historic and/or real-time confidence level, a historic and/or real-time accuracy level, or a combination thereof of the alternate traffic sign data, the learned traffic sign data, the traffic sign attribute, the geographic database, the alternate traffic sign service, or a combination thereof.

As discussed above, during supervised learning of traffic sign data from clustered TSR observations, the mapping platform 111 can compute a confidence metric indicating the likelihood that learned traffic sign data is indicative of an actual sign occurring on a given road segment or link. If a similar confidence metric is available for the other alternate data sources, the mapping platform 111 can apply a data selection rule that selects which traffic sign data to output based on their respective confidence metrics (e.g., selecting the traffic sign data associated with a highest confidence value). This confidence can be a "real-time" or instantaneous confidence associated with just the set of traffic sign data under consideration (e.g., confidence metric for the aggregated last 24 hours or X hours of TSR observations), or associated with a "historic" aggregation of confidence metrics (e.g., mean confidence metric for learned signs for a given link over a predetermined period). As similar comparison can be made for accuracy levels computed for the different data sources (e.g., computed as describe previously or equivalent). In yet another embodiment, the confidence and/or accuracy levels can be computed for each source, each set of traffic sign data, a given link, a given area in which the link is located, and/or the like. It is noted that confidence and accuracy are provided herein as examples of criteria that can be used in data selection rules and are not intended as limitations. For example, data selection criteria such as data freshness (e.g., most recently acquired or learned traffic sign data), number of samples or observations used to generate the traffic sign data, etc. can also be used.

Figure 9:
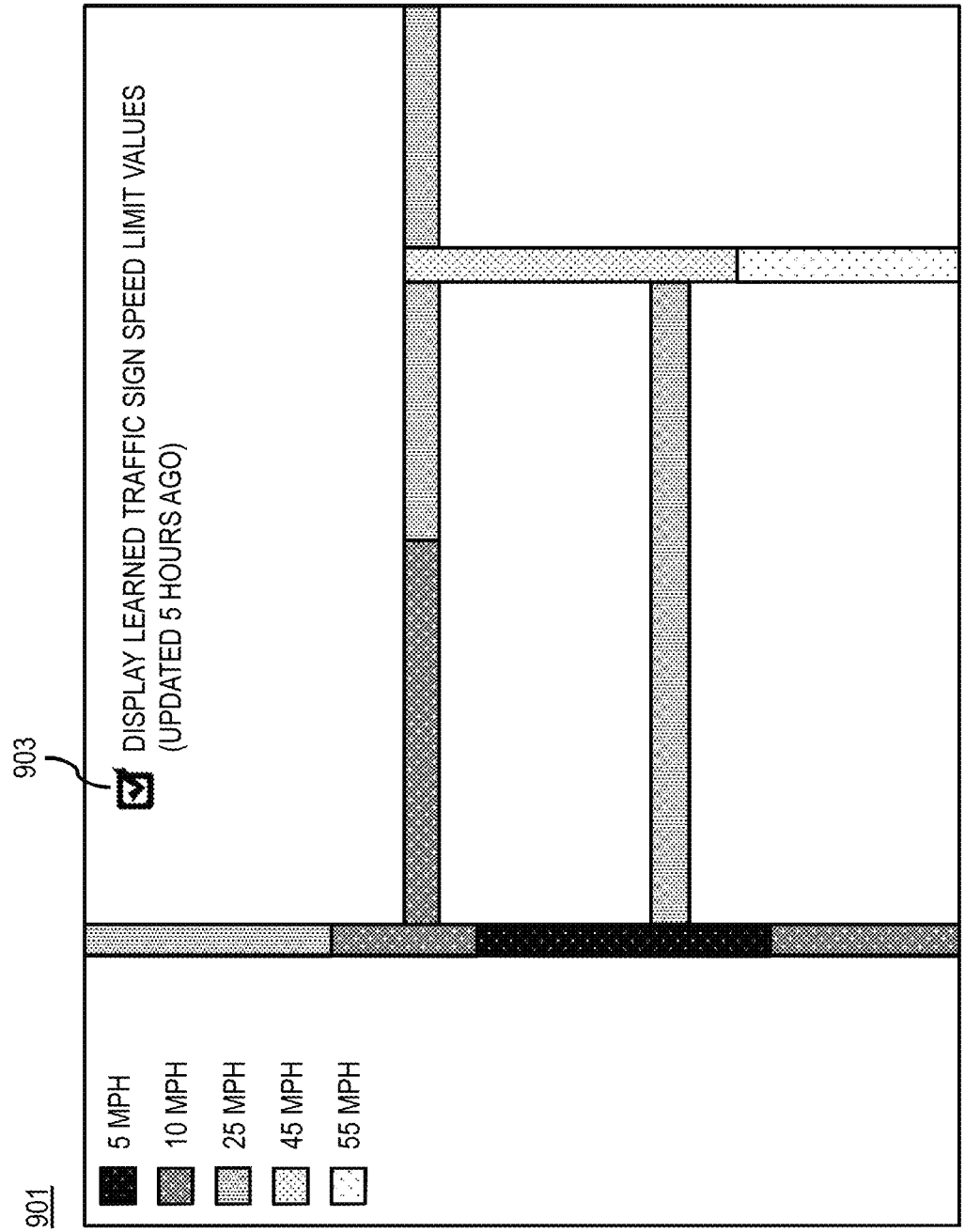
FIG. 9 is a diagram of a mapping user interface presenting learned traffic sign data, according to one embodiment.

After the data selection rules are applied to select from among available traffic sign data, the mapping platform 111 provides the selected traffic sign data for presenting a mapping user interface on a device, operating an autonomous vehicle, generating road attributes values for the geographic database 101, and/or any other use case for the traffic sign data (step 803). For example, FIG. 9 is a diagram of a mapping user interface (UI) 901 presenting learned traffic sign data, according to one embodiment. In the example of FIG. 9, a user has selected an option 903 to display learned traffic sign speed limit values. Based on this selection, the mapping platform 111 provides learned traffic sign data to, for instance, a user device (e.g., a navigation system of the vehicle 103, a user device such as a user equipment (UE) 123 executing an application 125 capable of presenting the mapping UI 901. The learned traffic sign speed limits values are based on TSR observations collected from other vehicles 103 that have previously traveled in the same area as the vehicle 103 of the current requesting user. The UE 123 or the navigation system of the vehicle 103 then uses the learned traffic sign data to generate visual representations of the learned traffic speed limit values overlaid on the representations of the corresponding road links of interest. As shown in UI 901, a color coding system is used to indicate learned speed limit values (e.g., from 5 mph to 55 mph) for each displayed road link.

Figure 10:
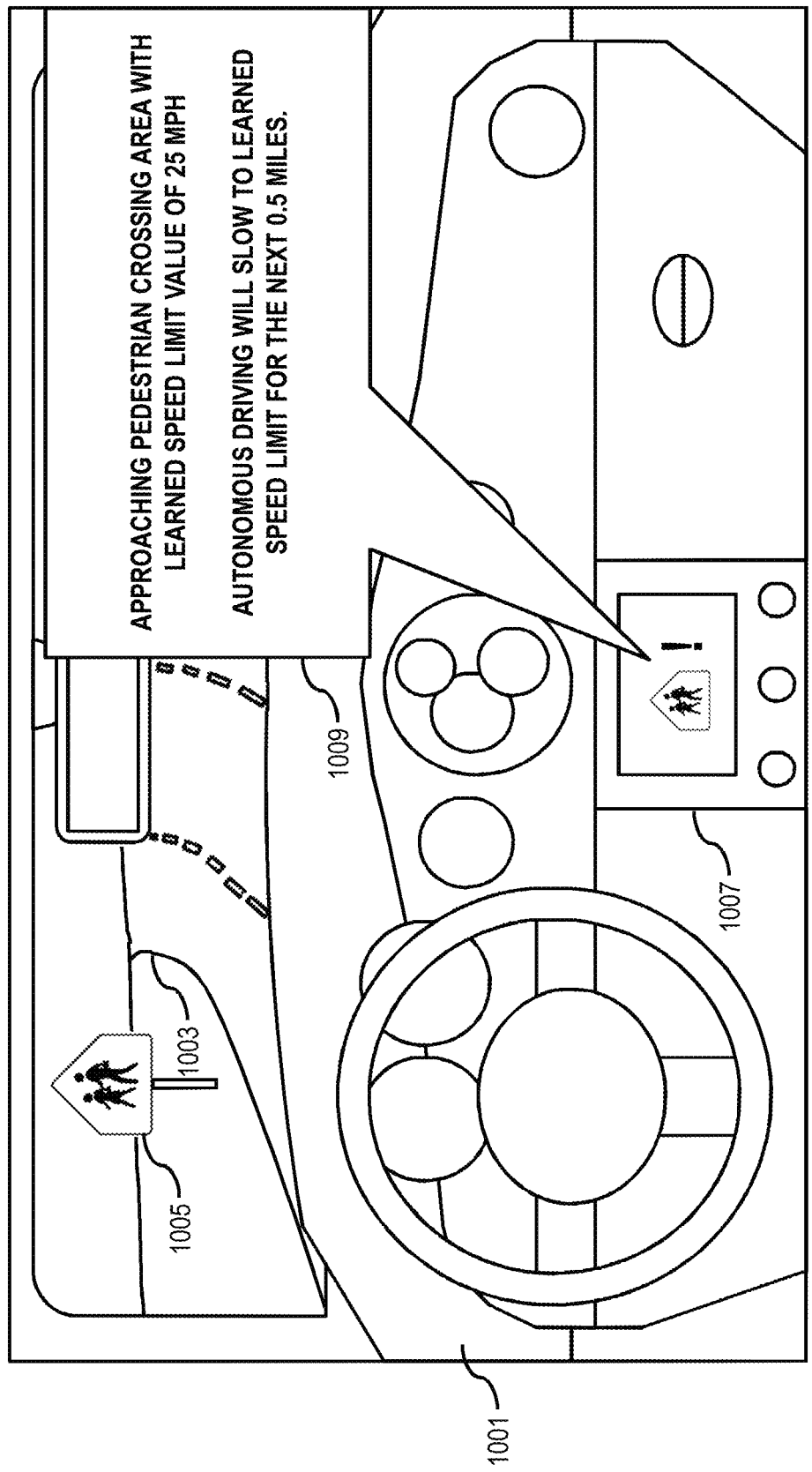
FIG. 10 is a diagram illustrating an example of using learned traffic sign data for autonomous driving, according to one embodiment.

FIG. 10 is a diagram illustrating an example of using learned traffic sign data for autonomous driving, according to one embodiment. In the example of FIG. 10, a vehicle 1001 is driving autonomously and approaches a road segment 1003 with a posted traffic sign 1005 indicating a pedestrian crossing area. In this jurisdiction, a pedestrian crossing traffic sign 1005 indicates a corresponding default speed limit of 25 mph absent any other posted speed limit. The mapping platform 111 has received TSR observations from the area and has learned a speed limit value of 25 mph for the road segment 1003. Accordingly, as the vehicle approaches the road segment 1003, the mapping platform 111 can provide (e.g., over a communication network 127) the learned traffic speed limit for the road segment 1003. In response, the vehicle 1001 can modify its autonomous driving accordingly (e.g., automatically slowing down to the learned speed limit). While no message need be shown to the driver or passengers of the vehicle 1001, in this example (for illustration purposes), a navigation system 1007 of the vehicle 1001 can present an alert 1009 that the vehicle 1001 is approaching a pedestrian crossing area with a learned speed limit of 25 mph, and that the vehicle 1001 will be slowing down accordingly for the length of the corresponding road segment 1003 (e.g., 0.5 miles).

Returning to FIG. 1, as shown, the system 100 includes a consumer or OEM vehicle 103 with connectivity to the mapping platform 111 and/or OEM platform 115 for providing TSR observations, determining learned traffic sign data, and/or using the learned traffic sign data according to the various embodiments described herein. In one embodiment, the vehicle 103 includes the computer vision system 109 with sensors 105 and an in-vehicle feature detector 113 for generating TSR observations for traffic sign learning. In some use cases, with respect to autonomous, navigation, mapping, and/or other similar applications, the in-vehicle feature detector 113 can detect traffic signs and their properties from input sensor data and generate.

In one embodiment, the mapping platform 111 can include a similar supervised learning mechanism that can include one or more feature detection models such as, but not limited to, neural networks, SVMs, decision trees, etc. to learn signs and sign properties from clustered TSR observations and make confidence calculations regarding the learned signs and/or properties. For example, the supervise learning mechanism can be based on a neural network such as a traditional convolutional neural network which consists of multiple layers of collections of one or more neurons (e.g., processing nodes of the neural network) which are configured to process input feature sets.

In one embodiment, the mapping platform 111, vehicle 103, UE 123, and/or other end user devices also have connectivity or access to the geographic database 101 which stores representations of mapped geographic features to facilitate autonomous driving and/or other mapping/navigation-related applications or services. The geographic database 101 can also store learned traffic sign data, as well as rules or filters for post-processing the learned traffic sign data and/or the TSR observations used for learning the traffic sign data according to the various embodiments described herein.

In one embodiment, the mapping platform 111, OEM platform 115, vehicle 103, UE 123, etc. have connectivity over the communication network 127 to the services platform 117 that provides one or more services 119 related to traffic sign learning (e.g., third-party traffic sign data services). By way of example, the services 119 may be third party services and include mapping services, navigation services, travel planning services, notification services, social networking services, content (e.g., audio, video, images, etc.) provisioning services, application services, storage services, contextual information determination services, location-based services, information-based services (e.g., weather, news, etc.), etc.

In one embodiment, the mapping platform 111, OEM platform 115, services platform 117, and/or other components of the system 100 may be platforms with multiple interconnected components. The mapping platform 111, OEM platform 115, services platform 117, etc. may include multiple servers, intelligent networking devices, computing devices, components and corresponding software for providing parametric representations of lane lines. In addition, it is noted that the mapping platform 111, OEM platform 115, computer vision system 109, etc. may be separate entities of the system 100, a part of the one or more services 119, a part of the services platform 117, or included within the UE 123 and/or vehicle 103.

In one embodiment, content providers 121a-121m (collectively referred to as content providers 121) may provide content or data (e.g., including learned traffic sign data or other geographic data) to the geographic database 101, the mapping platform 111, the computer vision system 109, the services platform 117, the services 119, the UE 123, the vehicle 103, and/or an application 125 executing on the UE 123. The content provided may be any type of content, such as map content, textual content, audio content, video content, image content, etc. In one embodiment, the content providers 121 may provide content that may aid in the detecting and classifying of traffic signs and their properties from sensor data (e.g., image data), and estimating the confidence and/or accuracy of the detected features. In one embodiment, the content providers 121 may also store content associated with the geographic database 101, mapping platform 111, OEM platform 115, computer vision system 109, services platform 117, services 119, UE 123, and/or vehicle 103. In another embodiment, the content providers 121 may manage access to a central repository of data, and offer a consistent, standard interface to data, such as a repository of the geographic database 101.

In one embodiment, the UE 123 and/or vehicle 103 may execute a software application 125 to collect, encode, and/or decode TSR observations for automated traffic sign learning according the embodiments described herein. By way of example, the application 125 may also be any type of application that is executable on the UE 123 and/or vehicle 103, such as autonomous driving applications, mapping applications, location-based service applications, navigation applications, content provisioning services, camera/imaging application, media player applications, social networking applications, calendar applications, and the like. In one embodiment, the application 125 may act as a client for the mapping platform 111, OEM platform 115, services platform 117, and/or services 119 and perform one or more functions associated with traffic sign learning.

By way of example, the UE 123 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 123 can support any type of interface to the user (such as "wearable" circuitry, etc.).

In one embodiment, the UE 123 may be associated with the vehicle 103 or be a component part of the vehicle 103.

In one embodiment, the UE 123 and/or vehicle 103 are configured with various sensors for generating or collecting environmental sensor data (e.g., for processing by the in-vehicle feature detector 113 and/or mapping platform 111), related geographic data, etc. including but not limited to, optical, radar, ultrasonic, LiDAR, etc. sensors. In one embodiment, the sensed data represent sensor data associated with a geographic location or coordinates at which the sensor data was collected. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the UE 123 and/or vehicle 103 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the UE 123 and/or vehicle 103 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the UE 123 and/or vehicle 103 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 127 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 111, OEM platform, services platform 117, services 119, UE 123, vehicle 103, and/or content providers 121 communicate with each other and other components of the system 100 using well known, new or still developing protocols. In this context, a protocol includes a set of rules defining how the network nodes within the communication network 127 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 11:
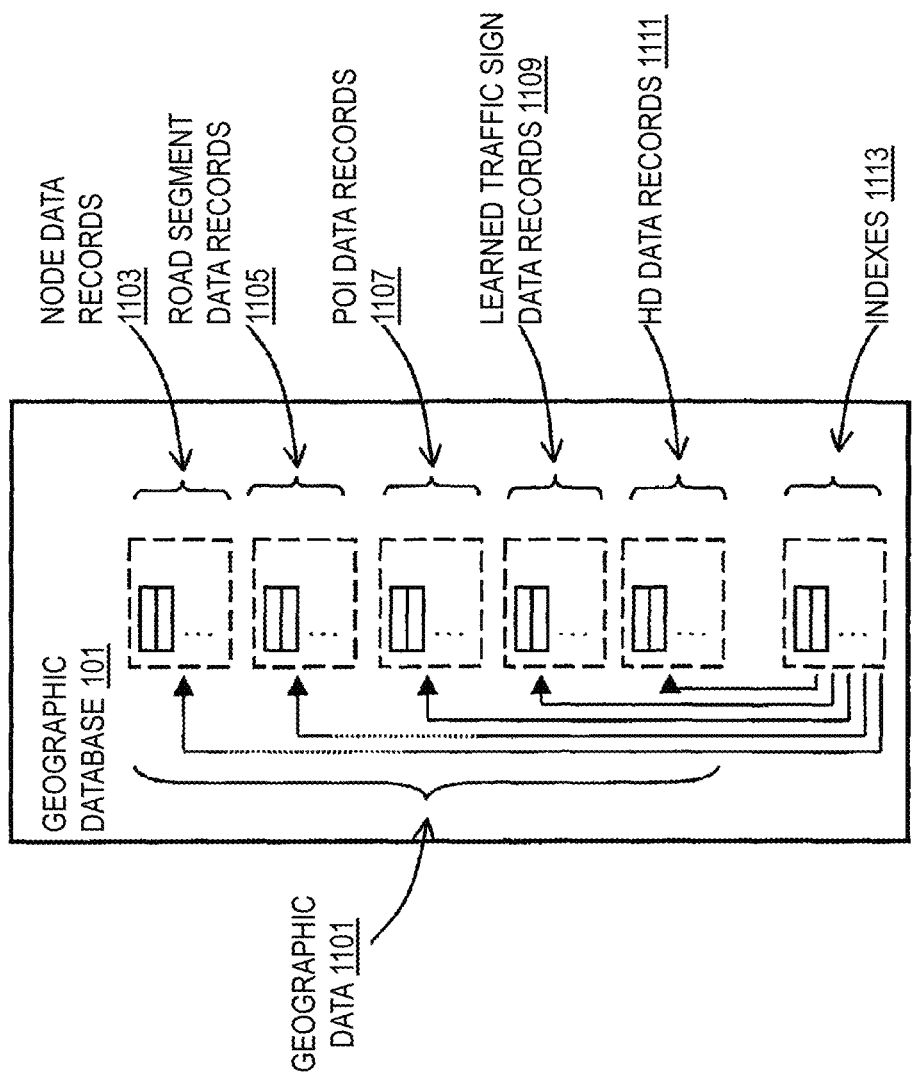
FIG. 11 is a diagram of a geographic database, according to one embodiment.

FIG. 11 is a diagram of a geographic database 101, according to one embodiment. In one embodiment, the geographic database 101 includes geographic data 1101 used for (or configured to be compiled to be used for) mapping and/or navigation-related services, such as for video odometry based on the parametric representation of lanes include, e.g., encoding and/or decoding parametric representations into lane lines. In one embodiment, the geographic database 101 include high resolution or high definition (HD) mapping data that provide centimeter-level or better accuracy of map features. For example, the geographic database 101 can be based on Light Detection and Ranging (LiDAR) or equivalent technology to collect billions of 3D points and model road surfaces and other map features down to the number lanes and their widths. In one embodiment, the HD mapping data (e.g., HD data records 1111) capture and store details such as the slope and curvature of the road, lane markings, roadside objects such as sign posts, including what the signage denotes. By way of example, the HD mapping data enable highly automated vehicles to precisely localize themselves on the road, and to determine road attributes (e.g., learned speed limit values) to at high accuracy levels.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 101.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 101 follows certain conventions. For example, links do not cross themselves and do not cross each other except at a node. Also, there are no duplicated shape points, nodes, or links. Two links that connect each other have a common node. In the geographic database 101, overlapping geographic features are represented by overlapping polygons. When polygons overlap, the boundary of one polygon crosses the boundary of the other polygon. In the geographic database 101, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

In one embodiment, the geographic database 101 is stored as a hierarchical or multilevel tile-based projection or structure. More specifically, in one embodiment, the geographic database 101 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

As shown, the geographic database 101 includes node data records 1103, road segment or link data records 1105, POI data records 1107, learned traffic sign data records 1109, HD mapping data records 1111, and indexes 1113, for example. More, fewer or different data records can be provided. In one embodiment, additional data records (not shown) can include cartographic ("carto") data records, routing data, and maneuver data. In one embodiment, the indexes 1113 may improve the speed of data retrieval operations in the geographic database 101. In one embodiment, the indexes 1113 may be used to quickly locate data without having to search every row in the geographic database 101 every time it is accessed. For example, in one embodiment, the indexes 1113 can be a spatial index of the polygon points associated with stored feature polygons.

In exemplary embodiments, the road segment data records 1105 are links or segments representing roads, streets, or paths, as can be used in the calculated route or recorded route information for determination of one or more personalized routes. The node data records 1103 are end points corresponding to the respective links or segments of the road segment data records 1105. The road link data records 1105 and the node data records 1103 represent a road network, such as used by vehicles, cars, and/or other entities. Alternatively, the geographic database 101 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 101 can include data about the POIs and their respective locations in the POI data records 1107. The geographic database 101 can also include data about places, such as cities, towns, or other communities, and other geographic features, such as bodies of water, mountain ranges, etc. Such place or feature data can be part of the POI data records 1107 or can be associated with POIs or POI data records 1107 (such as a data point used for displaying or representing a position of a city).

In one embodiment, the geographic database 101 can also include learned traffic sign data records 1109 for storing TSR observations and data on learned signs and their respective properties. In addition, the learned traffic sign data records 1109 can store post-processing rule sets for correcting and/or reducing the uncertainties in the traffic sign data learned from clustered TSR observations. The learned traffic sign data records 1109 can also store data selection rules (e.g., in a map data extension layer) for selecting from among multiple sets of traffic sign data that may be available for a given road link. The traffic sign data records 1109 can also store confidence or accuracy determinations for the learned traffic sign data. By way of example, the traffic sign data records 1109 can be associated with one or more of the node records 1103, road segment records 1105, and/or POI data records 1107 to support uses cases such as enhanced mapping UIs, autonomous driving, dynamic map updates, etc. In one embodiment, the feature detection data records 1109 are stored as a data layer of the hierarchical tile-based structure of the geographic database 101 according to the various embodiments described herein. In one embodiment, the geographic database 101 can provide the tile-based feature detection data records 1109 to automatic traffic sign learning using clustered TSR observations.

In one embodiment, as discussed above, the HD mapping data records 1111 model road surfaces and other map features to centimeter-level or better accuracy. The HD mapping data records 1111 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 1111 are divided into spatial partitions of varying sizes to provide HD mapping data to vehicles 103 and other end user devices with near real-time speed without overloading the available resources of the vehicles 103 and/or devices (e.g., computational, memory, bandwidth, etc. resources).

In one embodiment, the HD mapping data records 1111 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 1111.

In one embodiment, the HD mapping data records 1111 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 101 can be maintained by the content provider 121 in association with the services platform 117 (e.g., a map developer). The map developer can collect geographic data to generate and enhance the geographic database 101. There can be different ways used by the map developer to collect data. These ways can include obtaining data from other sources, such as municipalities or respective geographic authorities. In addition, the map developer can employ field personnel to travel by vehicle (e.g., vehicle 103 and/or UE 123) along roads throughout the geographic region to observe features and/or record information about them, for example. Also, remote sensing, such as aerial or satellite photography, can be used.

The geographic database 101 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF)) to organize and/or configure the data for performing navigation-related functions and/or services, such as route calculation, route guidance, map display, speed calculation, distance and travel time functions, and other functions, by a navigation device, such as by a vehicle 103 or UE 123. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing automatic traffic sign learning using clustered TSR observations may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 12:
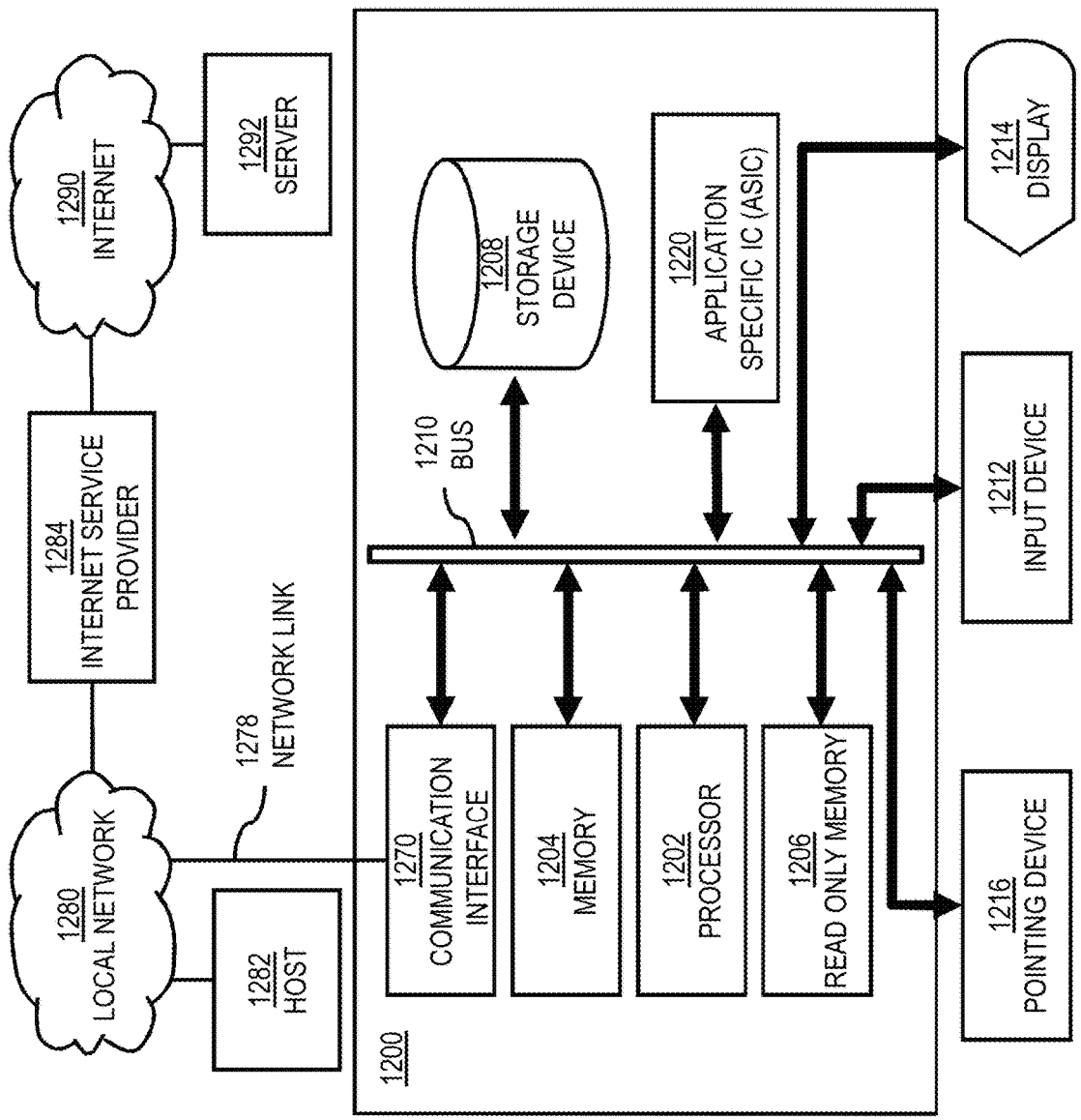
FIG. 12 is a diagram of hardware that can be used to implement an embodiment.

FIG. 12 illustrates a computer system 1200 upon which an embodiment may be implemented. Computer system 1200 is programmed (e.g., via computer program code or instructions) to provide automatic traffic sign learning using clustered TSR observations as described herein and includes a communication mechanism such as a bus 1210 for passing information between other internal and external components of the computer system 1200. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1210 includes one or more parallel conductors of information so that information is transferred quickly among devices coupled to the bus 1210. One or more processors 1202 for processing information are coupled with the bus 1210.

A processor 1202 performs a set of operations on information as specified by computer program code related to providing automatic traffic sign learning using clustered TSR observations. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1210 and placing information on the bus 1210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1202, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1200 also includes a memory 1204 coupled to bus 1210. The memory 1204, such as a random access memory (RAM) or other dynamic storage device, stores information including processor instructions for providing automatic traffic sign learning using clustered TSR observations. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of processor instructions. The computer system 1200 also includes a read only memory (ROM) 1206 or other static storage device coupled to the bus 1210 for storing static information, including instructions, that is not changed by the computer system 1200. Some memory is composed of volatile storage that loses the information stored thereon when power is lost. Also coupled to bus 1210 is a non-volatile (persistent) storage device 1208, such as a magnetic disk, optical disk or flash card, for storing information, including instructions, that persists even when the computer system 1200 is turned off or otherwise loses power.

Information, including instructions for providing automatic traffic sign learning using clustered TSR observations, is provided to the bus 1210 for use by the processor from an external input device 1212, such as a keyboard containing alphanumeric keys operated by a human user, or a sensor. A sensor detects conditions in its vicinity and transforms those detections into physical expression compatible with the measurable phenomenon used to represent information in computer system 1200. Other external devices coupled to bus 1210, used primarily for interacting with humans, include a display device 1214, such as a cathode ray tube (CRT) or a liquid crystal display (LCD), or plasma screen or printer for presenting text or images, and a pointing device 1216, such as a mouse or a trackball or cursor direction keys, or motion sensor, for controlling a position of a small cursor image presented on the display 1214 and issuing commands associated with graphical elements presented on the display 1214. In some embodiments, for example, in embodiments in which the computer system 1200 performs all functions automatically without human input, one or more of external input device 1212, display device 1214 and pointing device 1216 is omitted.

In the illustrated embodiment, special purpose hardware, such as an application specific integrated circuit (ASIC) 1220, is coupled to bus 1210. The special purpose hardware is configured to perform operations not performed by processor 1202 quickly enough for special purposes. Examples of application specific ICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a one-way or two-way communication coupling to a variety of external devices that operate with their own processors, such as printers, scanners and external disks. In general the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. For wireless links, the communications interface 1270 sends or receives or both sends and receives electrical, acoustic or electromagnetic signals, including infrared and optical signals, that carry information streams, such as digital data. For example, in wireless handheld devices, such as mobile telephones like cell phones, the communications interface 1270 includes a radio band electromagnetic transmitter and receiver called a radio transceiver. In certain embodiments, the communications interface 1270 enables connection to the communication network 127 for providing automatic traffic sign learning using clustered TSR observations.

The term computer-readable medium is used herein to refer to any medium that participates in providing information to processor 1202, including instructions for execution. Such a medium may take many forms, including, but not limited to, non-volatile media, volatile media and transmission media. Non-volatile media include, for example, optical or magnetic disks, such as storage device 1208. Volatile media include, for example, dynamic memory 1204. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 13 illustrates a chip set 1300 upon which an embodiment may be implemented. Chip set 1300 is programmed to provide automatic traffic sign learning using clustered TSR observations as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein to provide automatic traffic sign learning using clustered TSR observations. The memory 1305 also stores the data associated with or generated by the execution of the inventive steps.

Figure 14:
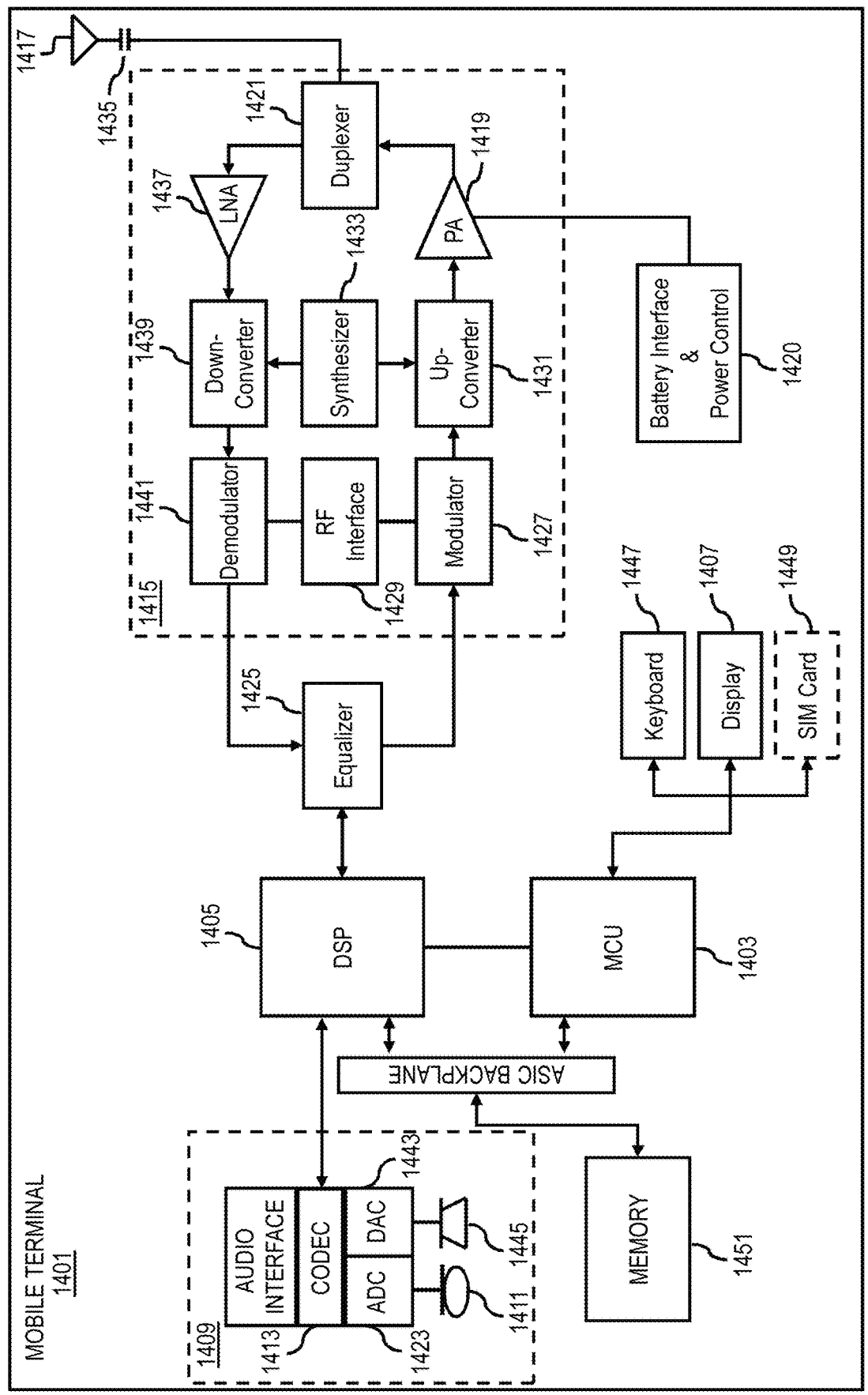
FIG. 14 is a diagram of a mobile terminal (e.g., handset or other mobile device, like a vehicle or part thereof) that can be used to implement an embodiment.

FIG. 14 is a diagram of exemplary components of a mobile terminal 1401 (e.g., handset or other mobile device, like a vehicle 103 or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile station functions that offer automatic contact matching. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system, via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile station 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403—which can be implemented as a Central Processing Unit (CPU) (not shown).

The MCU 1403 receives various signals including input signals from the keyboard 1447. The keyboard 1447 and/or the MCU 1403 in combination with other user input components (e.g., the microphone 1411) comprise a user interface circuitry for managing user input. The MCU 1403 runs a user interface software to facilitate user control of at least some functions of the mobile station 1401 to provide automatic traffic sign learning using clustered TSR observations. The MCU 1403 also delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the station. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile station 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1451 may be, but not limited to, a single memory, CD, DVD, ROM, RAM, EEPROM, optical storage, or any other non-volatile or non-transitory storage medium capable of storing digital data.

An optionally incorporated SIM card 1449 carries, for instance, important information, such as the cellular phone number, the carrier supplying service, subscription details, and security information. The SIM card 1449 serves primarily to identify the mobile station 1401 on a radio network. The card 1449 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for traffic sign learning comprising:
receiving a plurality of traffic sign observations generated using sensor data collected from a plurality of vehicles, wherein each of the plurality of traffic sign observations includes location data and sign property data for an observed traffic sign corresponding to said each of the plurality of traffic sign observations;
determining whether a number of the plurality of traffic sign observations satisfies a pre-determined threshold;
clustering, according to the determination, the plurality of traffic sign observations into at least one cluster based on the location data and the sign property data;
determining a learned sign for the at least one cluster; and
determining a learned sign value indicated by the learned sign based on the location data, the sign property data, or a combination of the plurality of traffic sign observations aggregated in the at least one cluster.

2. The method of claim 1, wherein the observed traffic sign is a traffic speed sign, and wherein the learned sign value is a traffic speed indicated by the learned sign for a road segment corresponding to a learned sign location.

3. The method of claim 2, wherein the learned sign location is determined based on a mean of the location data for the plurality of traffic sign observations aggregated in the at least one cluster.

4. The method of claim 1, wherein the sign property data includes a sign value, a sign type, a side of a road on which the observed traffic sign is detected, a time stamp, or a combination thereof; and wherein the location data includes a location, a heading, a speed, or a combination thereof of a reporting vehicle when the observed traffic sign is detected.

5. The method of claim 4, further comprising:
map matching the location, the heading, or a combination thereof of the reporting vehicle to one or more records of a geographic database,
wherein the location data is based on the map matching.

6. The method of claim 1, further comprising:
determining a confidence value, an accuracy level, or a combination thereof for the learned sign, the learned sign value, or a combination thereof; and
selecting between (1) providing the learned sign, the learned sign value, or a combination thereof, and (2) providing traffic sign data from an alternate data source based on the confidence value, the accuracy level, or a combination thereof.

7. The method of claim 1, further comprising:
associating the learned sign value with a road link record of a geographic database.

8. The method of claim 1, further comprising:
providing the learned sign value for presenting a mapping user interface on a device, operating an autonomous vehicle, or a combination thereof.

9. The method of claim 1, further comprising:
updating a road link record of a geographic database based on the learned sign value.

10. An apparatus for road sign learning comprising:
at least one processor; and
at least one memory including computer program code for one or more programs,
the at least one memory and the computer program code configured to, with the at least one processor, cause the apparatus to perform at least the following,
select road sign data from either learned road sign data or alternate road sign data based on one or more rules, wherein the learned road sign data is determined based on clustering, according to a determination that a number of a plurality of road sign observations satisfies a pre-determined threshold, the plurality of road sign observations according to location data and sign property data generated using sensor data collected from a plurality of vehicles; and
provide the selected road sign data for presenting a mapping user interface on a device, operating an autonomous vehicle, or a combination thereof.

11. The apparatus of claim 10, wherein the one or more rules for determining the selected road sign data for a road link of interest are stored in a filter layer of a geographic database.

12. The apparatus of claim 11, wherein the alternate road sign data is a road sign attribute stored for the road link in the geographic database, and wherein the one or more rules select the stored road sign attribute when the learned road sign data is not available for the road link.

13. The apparatus of claim 11, wherein the one or more rules select the learned road sign data over the alternate road sign data when the learned road sign data is available for the road link.

14. The apparatus of claim 11, wherein the alternate road sign data is available from an alternate road sign service, and wherein the one or more rules are used to select from among the alternate road sign data, the learned road sign data, and a road sign attribute stored for the road link in the geographic database.

15. The apparatus of claim 14, wherein the selecting of the road sign data is based on a historic and/or real-time confidence level, a historic and/or real-time accuracy level, or a combination thereof of the alternate road sign data, the learned road sign data, the road sign attribute, the geographic database, the alternate road sign service, or a combination thereof.

16. A non-transitory computer-readable storage medium for traffic sign learning, carrying one or more sequences of one or more instructions which, when executed by one or more processors, cause an apparatus to perform:
clustering, according to a determination that a number of a plurality of traffic sign observations satisfies a pre-determined threshold, the plurality of traffic sign observations into one or more clusters, wherein the plurality of traffic sign observations relate to at least one traffic speed sign detected from sensor data of a plurality of vehicles, and wherein the plurality of traffic sign observations includes data indicating a sign speed value, a sign type, a location of a reporting vehicle when a respective traffic sign observation is made, a side of a road on which the respective traffic sign observation is made, a time stamp, or a combination thereof;
determining a learned sign speed value based on the one or more sign clusters; and
updating a speed attribute of a road link record of a geographic database based on the learned sign value.

17. The non-transitory computer-readable storage medium of claim 16, wherein the clustering uses density-based clustering to aggregate the plurality of traffic sign observations into the one or more clusters based on a similarity with respect to the sign speed value, the sign type, the location of the reporting vehicle, the side of the road, the time stamp, or a combination thereof.

18. The non-transitory computer-readable storage medium of claim 16, wherein the clustering is further based on a distance threshold applied to the location of the reporting vehicle.

19. The non-transitory computer-readable storage medium of claim 16, wherein the apparatus is further caused to perform:
merging at least two clusters of the one or more clusters based on determining the at least two clusters are within a threshold distance.

20. The non-transitory computer-readable storage medium of claim 16, wherein a learned sign location is determined based on a mean of the location of the reporting vehicle for the plurality of traffic sign observations clustered into a respective cluster of the one or more clusters.

* * * * *